United States Patent
Zhou et al.

(10) Patent No.: US 9,955,458 B1
(45) Date of Patent: Apr. 24, 2018

(54) SHARED ALLOCATION OF A DOWNLINK RESOURCE BLOCK

(71) Applicant: Sprint Spectrum L.P., Overland Park, KS (US)

(72) Inventors: Yu Zhou, Herndon, VA (US); Muhammad Ahsan Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 660 days.

(21) Appl. No.: 14/558,866

(22) Filed: Dec. 3, 2014

(51) Int. Cl.
*H04L 27/26* (2006.01)
*H04W 72/04* (2009.01)

(52) U.S. Cl.
CPC ......... *H04W 72/04* (2013.01); *H04L 27/2601* (2013.01)

(58) Field of Classification Search
CPC ........................... H04W 72/04; H04L 27/2601
USPC ..................... 370/252, 329; 375/261, 267
See application file for complete search history.

(56) References Cited

U.S. PATENT DOCUMENTS

| | | | | |
|---|---|---|---|---|
| 2006/0067421 A1* | 3/2006 | Walton | ................. | H04B 7/0615 375/267 |
| 2008/0260061 A1* | 10/2008 | Javaudin | ............. | H04L 27/2082 375/261 |
| 2010/0208608 A1* | 8/2010 | Wang | ................. | H04W 52/325 370/252 |

* cited by examiner

*Primary Examiner* — Marsha D. Banks Harold
*Assistant Examiner* — Natasha W Cosme

(57) ABSTRACT

A one or more downlink resource elements of a downlink resource block in an orthogonal frequency division multiplexing (OFDM) communication system can be shared by two wireless communication devices (WCDs) by assigning each WCD a different one of two orthogonal modulation axes. To transmit data to two WCDs using the same downlink resource block, a base station may receive a data stream including respective data for each of the WCDs, then modulate the data for one WCD on in-phase modulation axis and modulate that data for the other WCD on the quadrature axis. The two modulation modes can be simultaneously transmitted on a common sub-carrier of an OFDM downlink to both WCDs. Each WCD can demodulate the data on a pre-assigned demodulation axis to recover its intended data. This sharing technique can be applied to some or all of the downlink resource elements of a commonly allocated downlink resource block.

20 Claims, 14 Drawing Sheets

SHARED ALLOCATION OF A DOWNLINK RESOURCE BLOCK

BACKGROUND

Unless otherwise indicated herein, the materials described in this section are not prior art to the claims and are not admitted to be prior art by inclusion in this section.

In a wireless communication system, a base station may transmit downlink data to one or more wireless communication devices (WCDs) that are operating in a wireless coverage area provided by the base station. The wireless coverage area could be, for example, a cell or a sector. The base station may also receive uplink data from one or more WCDs operating in the wireless coverage area.

Some of the downlink data transmitted by the base station may be transmitted in a downlink channel that can be shared among multiple WCDs. For example, the Long Term Evolution (LTE) of the Universal Mobile Telecommunications System (UMTS) defines a Physical Downlink Shared Channel (PDSCH) as the primary downlink channel for transmitting user data to WCDs. In addition, LTE defines downlink control channels that carry various types of control signaling. The downlink control channels include a Physical Control Format Indicator Channel (PCFICH), a Physical Downlink Control Channel (PDCCH), and a Physical Hybrid ARQ Indicator Channel (PHICH).

In the LTE approach, downlink resources are mapped in the time domain and in the frequency domain. In the time domain, LTE defines 10 millisecond (ms) frames, 1 ms sub-frames and 0.5 ms slots. Thus, each frame has 10 sub-frames, and each sub-frame has 2 slots. Each slot is further sub-divided into a fixed number of symbol transmission times. The fixed number is typically either 7 (although some implementations can use 6). In the frequency domain, resources are divided into groups of 12 sub-carriers. Each sub-carrier is 15 kHz wide, so each group of 12 sub-carriers occupies a 180 kHz bandwidth. During each symbol transmission time, the sub-carriers are modulated together, using orthogonal frequency division multiplexing (OFDM), to form one OFDM symbol.

LTE further defines a particular grouping of time-domain and frequency-domain resources as a downlink resource block. In the time domain, each downlink resource block has a duration corresponding to one slot (0.5 ms). In the frequency domain, each downlink resource block consists of a group of 12 sub-carriers that are used together to form OFDM symbols. Typically, the 0.5 ms duration of a downlink resource block accommodates 7 OFDM symbols. Depending on the bandwidth of the system, multiple downlink resource blocks can be transmitted in each 0.5 ms slot. For example, a system with a 5 MHz bandwidth may be able to transmit 25 downlink resource blocks in each 0.5 ms slot.

The smallest unit of downlink resources is the resource element. Each resource element corresponds to one sub-carrier and one OFDM symbol. Thus, a resource block that consists of 12 sub-carriers and 7 OFDM symbols has 84 resource elements. Within a resource block, different resource elements can have different functions. In particular, a certain number of the resource elements (e.g., 8 resource elements) may be reserved for reference signals used for channel estimation. In addition, a certain number of the resource elements (e.g., the resource elements in the first one to four OFDM symbols) may be reserved for control signals in the PCFICH, PDCCH, and PHICH channels. The remaining resource elements in a downlink resource block can be used for user data in the PDSCH channel.

The PDSCH channel can be shared among WCDs by allocating one or more downlink resource blocks to each WCD. Conventionally, the user data (PDSCH channel) in a downlink resource block that is allocated to a particular WCD is for only that particular WCD. Thus, while the PDSCH channel can be shared by multiple WCDs, the user data in a downlink resource block might be for only one WCD.

OVERVIEW

Under conventional operation in a system such as the one described above, the smallest air-interface unit that a base station can assign for transmission of data to a given WCD is a PDSCH segment corresponding to one 12-subcarrier-wide resource block. Each of the 84 resource elements of an allocated resource block can therefore be considered as being allocated to the given WCD as well. The number of bits of data that can be carried in each resource element depends on the modulation scheme used. For example, if Quadrature Phase Shift Keying (QPSK) is used, then each sub-carrier symbol represents two bits of data. If Quadrature Amplitude Modulation (QAM) is used for the sub-carrier symbols, then each sub-carrier symbol represents a greater number of bits: four bits per symbol for 16-QAM and six bits per symbol for 64-QAM. For a fixed OFDM symbol rate, the bit rate of data transmission can therefore vary depending on (among other possible factors) the modulation scheme used.

Under LTE, the modulation scheme used during any given symbol transmission time, and therefore the data rate, can be different for the different sub-carriers—and correspondingly for different resource elements transmitted—during the given symbol transmission time. Typically, the modulation scheme will be the same for all sub-carriers assigned to a given user during a symbol transmission time. Selection of the modulation scheme used for a given sub-carrier during a given symbol transmission time can depend on radio frequency (RF) operation conditions (e.g., signal-to-noise) during the given symbol transmission time. Similarly, the modulation scheme can be adapted according to RF conditions at different symbol transmissions times, so that a different modulation scheme can be used for the same sub-carrier at different times.

The conventional approach of allocating a downlink resource block to only a single WCD can in some instances lead to inefficiencies. For example, if a downlink resource block that is able to provide data at a relatively high data rate, such as 1 Mbits/second is allocated to a user for data that has a much lower data rate (e.g., voice data), then the user may have in effect been allocated more bandwidth than necessary. It would therefore be desirable to provide more efficient use of downlink resources. Accordingly, methods and systems disclosed herein enable a downlink resource block to be allocated on a shared basis to more than one WCD. Further, when a downlink resource block is shared among two WCDs, each WCD's data may be modulated along a different one of two orthogonal modulation axes.

Hence, in one respect, various embodiments of the present invention provide a method comprising: allocating a particular downlink orthogonal frequency division multiplexing (OFDM) resource element to both a first wireless communication device (WCD) operating in a wireless communication system and a second WCD operating in the wireless communication system, wherein the particular downlink OFDM resource element is one of a plurality of OFDM resource elements configured for transmission by the wireless communication system on respective, orthogonal sub-carriers during a common symbol transmission time; determining a first N-bit binary number to be transmitted to the first WCD and a second N-bit binary number to be transmitted to the second WCD; modulating the first N-bit binary number to a first real data-symbol value on a real-number axis of a complex modulation plane, and modulating the second N-bit binary number to a first imaginary data-symbol value on an imaginary-number axis of the complex modulation plane; generating a first complex data symbol as a complex sum of the first real data-symbol value and the first imaginary data-symbol value; and by a transmitter of the wireless communication system, transmitting the first complex data symbol in the particular downlink OFDM resource element simultaneously to both the first and second WCDs in a simultaneous transmission on all the orthogonal sub-carriers of the plurality of OFDM resource elements, wherein the first WCD is configured to recover the first N-bit binary number by demodulating the first complex data symbol along a real-number axis of a complex demodulation plane, and the second WCD is configured to recover the second N-bit binary number by demodulating the first complex data symbol along an imaginary-number axis of the complex demodulation plane.

In another respect, various embodiments of the present invention provide a method comprising: a wireless communication device (WCD) receiving an indication of a downlink resource block being allocated to the WCD, wherein the downlink resource block comprises multiple downlink OFDM resource elements arrayed for a respective simultaneous transmission across a contiguous sequence of orthogonal sub-carriers at each respective one of a contiguous sequence of symbol transmission times; the WCD receiving a mode indication identifying at least one downlink OFDM resource element of the multiple downlink OFDM resource elements as containing a complex data symbol, of which only a specified one of (i) a real-number component or (ii) an imaginary-number component is intended for the WCD; the WCD receiving the at least one downlink OFDM resource element in a wireless transmission; the WCD recovering the real-number component of the complex data symbol contained in the at least one downlink OFDM resource element if the mode indication specifies that the real-number component is intended for the WCD; and the WCD recovering the imaginary-number component of the complex data symbol contained in the at least one downlink OFDM resource element if the mode indication specifies that the imaginary-number component is intended for the WCD.

Further, in still another respect, various embodiments of the present invention provide a base station comprising: a transmitter for transmitting downlink data to wireless communication devices (WCDs) operating in a wireless coverage area of the base station; one or more processors; memory accessible to the one or more processors; and machine-readable instructions stored in the memory, that upon execution by the one or more processors cause the base station to carry out operations including: allocating a particular downlink orthogonal frequency division multiplexing (OFDM) resource element to both a first WCD operating in the wireless coverage area and a second WCD operating in the wireless coverage area, wherein the particular downlink OFDM resource element is one of a plurality of OFDM resource elements configured for transmission by the base station on respective, orthogonal sub-carriers during a common symbol transmission time, determining a first N-bit binary number to be transmitted to the first WCD and a second N-bit binary number to be transmitted to the second WCD, modulating the first N-bit binary number to a first real data-symbol value on a real-number axis of a complex modulation plane, and modulating the second N-bit binary number to a first imaginary data-symbol value on an imaginary-number axis of the complex modulation plane, generating a first complex data symbol as a complex sum of the first real data-symbol value and the first imaginary data-symbol value, and causing the transmitter to transmit the first complex data symbol in the particular downlink OFDM resource element simultaneously to both the first and second WCDs in a simultaneous transmission on all the orthogonal sub-carriers of the plurality of OFDM resource elements, wherein the first WCD is configured to recover the first N-bit binary number by demodulating the first complex data symbol along a real-number axis of a complex demodulation plane, and the second WCD is configured to recover the second N-bit binary number by demodulating the first complex data symbol along an imaginary-number axis of the complex demodulation plane.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

1. EXAMPLE COMMUNICATION SYSTEM

Figure 1:
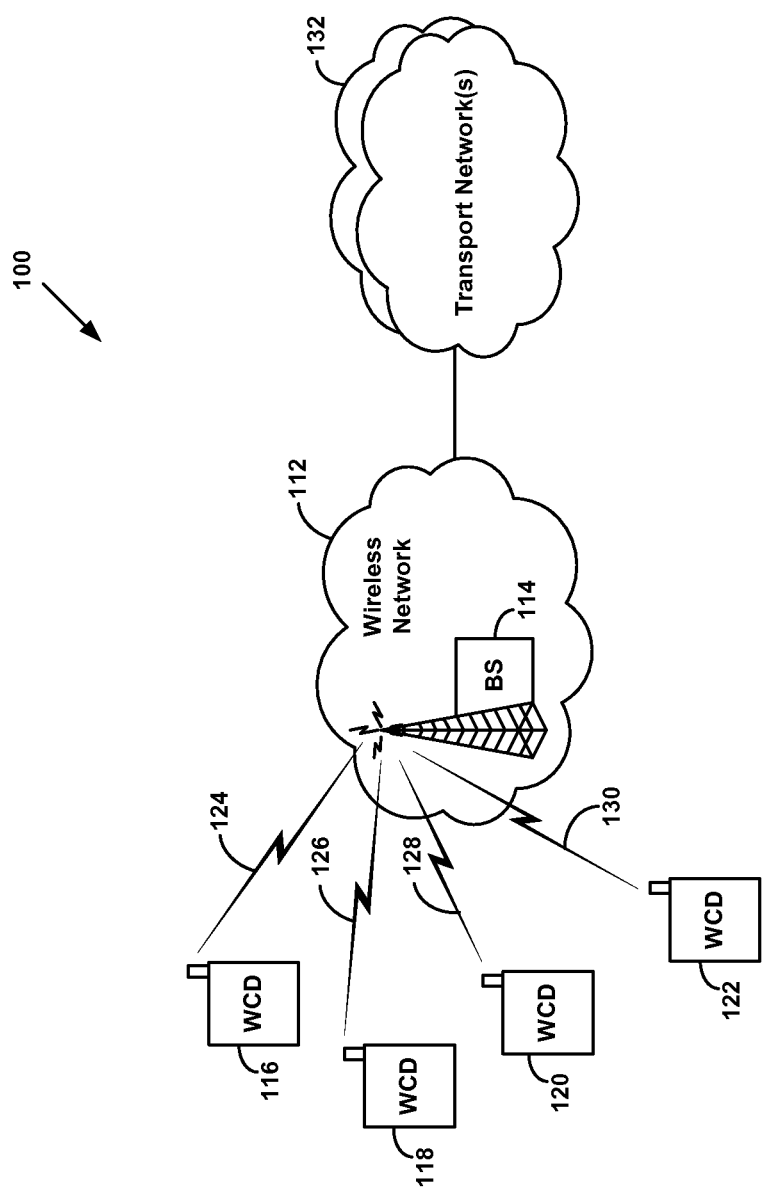
FIG. 1 is a simplified block diagram of a communication system, in accordance with an example embodiment.

FIG. 1 is a block diagram of a communication system 100 in which example embodiments may be employed. Communication system 100 includes a wireless network 112 that includes one or more entities that can communicate over an air interface, as exemplified by base station (BS) 114. Wireless network 112 could also include one or more control entities, such as a base station controller (BSC) or radio network controller (RNC). Wireless network 112 could be, for example, a radio access network (RAN). BS 114 could be, for example, a base transceiver station, a wireless access point, an access node, a Node-B, or an eNodeB. Although FIG. 1 shows only one base station in wireless network 112, it is to be understood that wireless network 112 could include any number of base stations.

BS 114 radiates to define one or more wireless coverage areas within which BS 114 can wirelessly communicate with WCDs. The wireless coverage area defined by BS 114 could be a cell that generally surrounds BS 114. Alternatively, BS 114 may define multiple wireless coverage areas, such as sectors. Each sector may be defined by multiple antennas in BS 114 so as to generally correspond to a range of azimuthal angles (e.g., 120°) about BS 114.

For purposes of illustration, BS 114 is shown as being in wireless communication with WCDs 116, 118, 120, and 122 via respective air interfaces 124, 126, 128, and 130. By way of example, WCDs 116-122 could be wireless telephones, wireless handheld or laptop computers, or other types of wireless communication devices. Although FIG. 1 shows BS 114 in wireless communication with four WCDs, it is to be understood that BS 114 could be in wireless communication with a greater or fewer number of WCDs. In addition, the number of WCDs in wireless communication with BS 114 can change over time, for example, as a result of one or more WCDs moving into or out of the wireless coverage area of BS 114 and/or as a result of one or more WCDs beginning or ending communication sessions.

Each of air interfaces 124-130 could include a respective uplink, with which a WCD can transmit data to BS 114, and a respective downlink, with which BS 114 can transmit data to a WCD. The communications over air interfaces 124-130 could conform to any wireless protocol now known or later developed. For purposes of illustration, the communications over air interfaces 124-130 will be described herein with respect to the LTE protocol.

Wireless network 112 may provide connectivity with one or more transport networks 132, which could include, for example, the public switched telephone network (PSTN) and/or the Internet or other packet-switched networks. With this arrangement, a WCD being served by BS 114 may engage in a communication session, via wireless network 112, with an endpoint connected to one of transport networks 132. The endpoint could be, for example, another WCD, a landline telephone, an email server, Web server, media server, or gaming server. The communication session could involve voice, text, images, video, data, or other media that is transferred from the WCD to the endpoint and/or from the endpoint to the WCD.

Thus, when a WCD, such as WCD 116, 118, 120, or 122, is involved in a communication session, the WCD may transmit data over an uplink channel to BS 114 and may receive data from BS 114 over a downlink channel. In some cases, the communication session could be one that involves a user of the WCD, such as a voice communication application or Web browsing application. In other cases, the communication session could involve a background task, such as periodically registering with wireless network 112.

In some implementations, BS 114 may transmit data to WCDs 116-122 over a shared downlink channel. The usage of the shared downlink channel may be controlled by BS 114 or by some other entity in wireless network 112. For example, the LTE protocol defines a Physical Downlink Shared Channel (PDSCH) that a base station can use to transmit data to multiple WCDs that are operating in its wireless coverage area. Portions of the PDSCH may be allocated to particular WCDs in the form of downlink resource blocks.

Figure 2A:
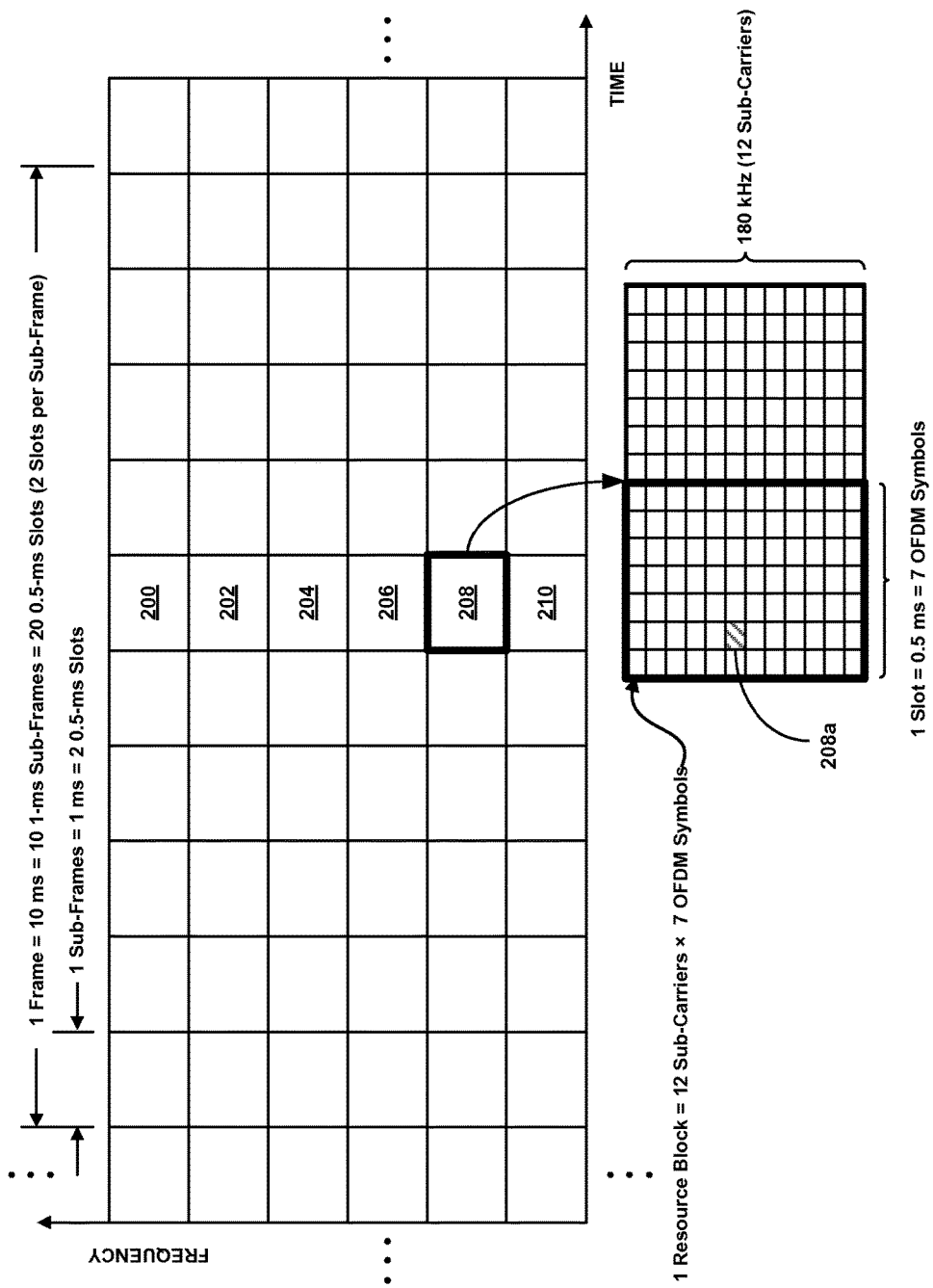
FIG. 2A is a conceptual illustration of a division of a shared downlink channel into downlink resource blocks, in accordance with an example embodiment.

FIG. 2A illustrates how the downlink resources in a given wireless coverage area may be divided in time and frequency domains into resource blocks. In the time domain, each resource block occupies a 0.5 ms slot of a 1 ms sub-frame. Every group of 10 consecutive sub-frames makes up one transmission frame.

By way of example, FIG. 2A shows resource blocks 200-210 for a particular slot. In the frequency domain, each of resource blocks 200-210 occupies a respective portion of frequency bandwidth, typically 180 kHz in LTE implementations. Although FIG. 2A shows six resource blocks in each sub-frame, a wireless coverage area could have a greater number of resource blocks, as indicated by the vertical ellipses above and below resource blocks in the figure.

FIG. 2A also includes a more detailed view of downlink resource block 208. This detailed view shows that the 180 kHz of frequency bandwidth corresponds to 12 sub-carriers of 15 kHz each, and also shows that the 0.5 ms slot corresponds to the duration of 7 OFDM symbols (the number of OFDM symbols in a downlink resource block can vary). The detailed view also depicts the slot 208 as half of one sub-frame.

Each OFDM symbol in a given resource block spans the 12 sub-carriers and includes a respective sub-carrier symbol on each sub-carrier. Thus, a downlink resource block may be described as a set of resource elements, with each resource element corresponding to a sub-carrier symbol that is carried on a particular sub-carrier for the duration of one OFDM symbol, also referred to herein as a symbol transmission time. The detailed view of downlink resource block 208 in FIG. 2A shows the division of the resource block into multiple resource elements, such as resource element 208a.

Each sub-carrier symbol or resource element represents a data block of a certain number of bits, depending on the type of modulation that is used. For example, if Quadrature Phase Shift Keying (QPSK) is used for the sub-carrier symbols, then each sub-carrier symbol represents two bits of data. If Quadrature Amplitude Modulation (QAM) is used for the sub-carrier symbols, then each sub-carrier symbol represents a greater number of bits: four bits per symbol for 16QAM and six bits per symbol for 64QAM.

Figure 2B:
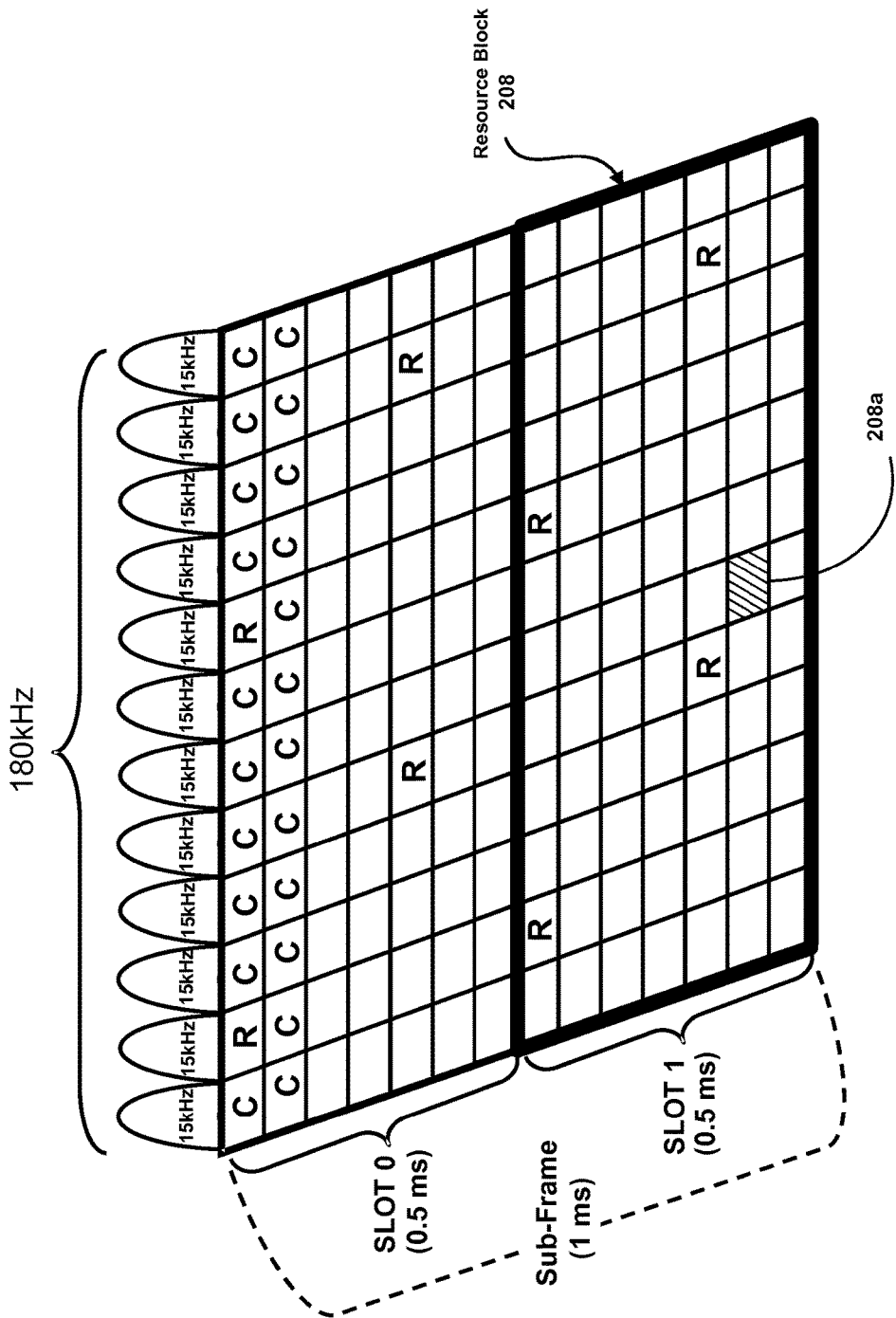
FIG. 2B is a conceptual illustration of a downlink resource block, in accordance with an example embodiment.

Different resource elements in a downlink resource block may be used for different purposes. FIG. 2B illustrates different functions among the 168 resource elements in two example downlink resource blocks of an example sub-frame for a one-antenna port system. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (PCFICH, PDCCH, and PHICH channels). The other 138 resource elements that are unlabeled can be used to transmit user data (PDSCH channel). It is to be understood that FIG. 2B illustrates only one possible configuration. In other configurations, a downlink resource block could have a greater or fewer number of resource elements available to transmit user data.

Figure 3:
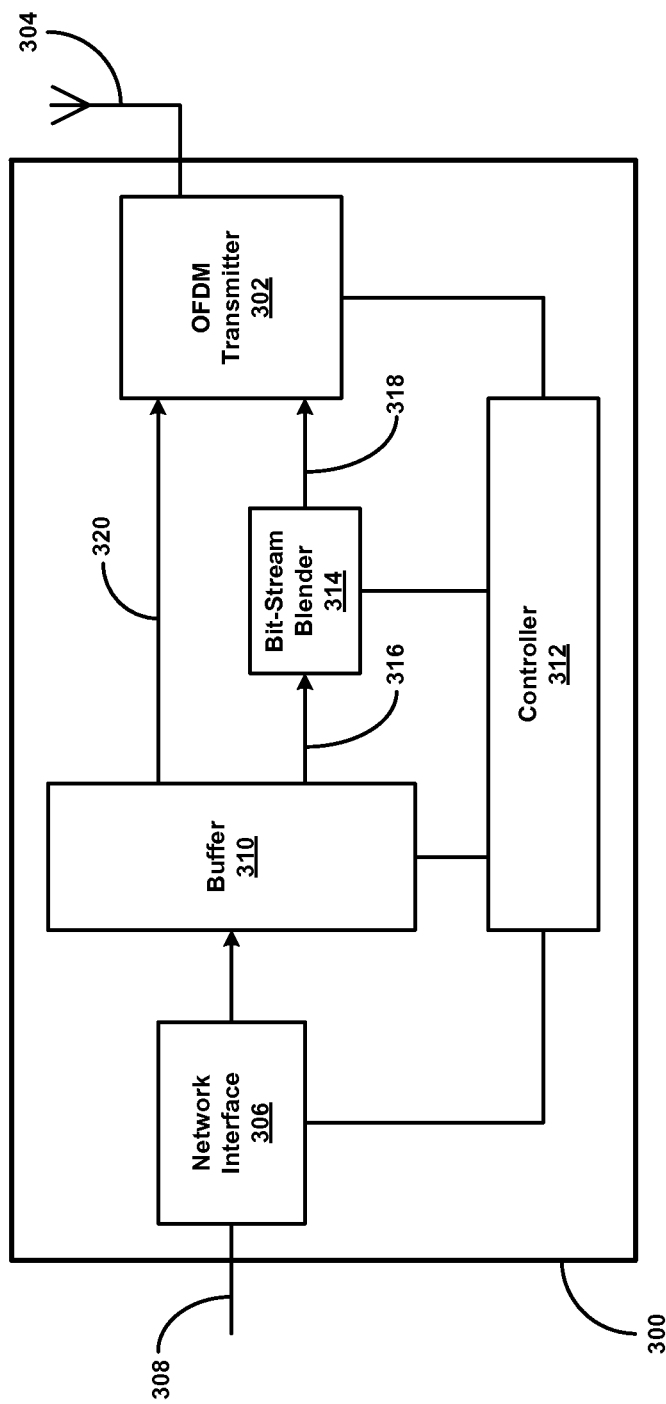
FIG. 3 is a functional block diagram of a base station, in accordance with an example embodiment.

FIG. 3 is a functional block diagram of an example base station 300. Base station 300 could, for example, be part of a communication system as shown in FIG. 1. Thus, base station 300 could correspond to base station 114. For purposes of illustration, base station 300 will be described as using OFDM and downlink resource blocks as shown in FIGS. 2A and 2B and described above. It is to be understood, however, that other types of air interfaces could be used.

As shown in FIG. 3, base station 300 includes an OFDM transmitter 302 for transmitting downlink data to WCDs operating in a wireless coverage of base station 300. The transmissions could occur through one or more antennas (either directional or omni-directional), as exemplified by antenna 304. As described in more detail below, OFDM transmitter 302 is configured to receive a data stream, generate OFDM symbols from the data stream, and transmit the OFDM symbols in one or more resource blocks. In addition to OFDM transmitter 302, base station may include an OFDM receiver (not shown) for receiving uplink data transmitted by WCDs operating in its wireless coverage area. The base station 300 can also include a bit-stream blender 314 for blending data from two (or possible more) WCDs in instances in which one or more downlink resource blocks are allocated to two WCDs at the same time.

Base station 300 includes a network interface 306 for receiving data over a backhaul connection 308 that connects base station 300 to one or more entities in a wireless network. The backhaul connection 308 can include wireless and/or wireline communication links. The data that base station 300 receives via backhaul connection 308 and network interface 306 can include data for one or more WCDs operating in its wireless coverage area. Base station 300 may accumulate such data, for example, in a buffer 310, for subsequent transmission to WCDs.

A controller 312 in base station 300 may control the transmission of data in buffer 310 to WCDs using OFDM transmitter 302. For example, controller 312 may allocate downlink resource blocks to WCDs and schedule the transmission of data by OFDM transmitter 302 based on the allocated resource blocks. Controller 312 could be implemented using hardware, software, and/or firmware. For example controller 312 could include one or more processors and a non-transitory computer readable medium (e.g., volatile and/or non-volatile memory) that stores executable instructions. The executable instructions, when executed by the one or more processors, may cause controller 312 (and/or the base station 300) to perform any of the base station functions described herein.

When allocating a downlink resource block, the controller 312 may determine if the downlink resource block can be shared by two different WCDs at the same time. For example, the determination may take account of the transmission bit rate that can be supported on the respective downlink to each of two particular WCDs, as well as the required or preferred bit rate for supporting current download communication needs of the two WCDs. The download communication needs of each WCD could, for instance, depend on the types of applications or programs running on each WCD that consume or process the data in received download transmissions. If the transmission bit rate that can be supported on the respective downlink to each of the two particular WCDs is large enough to simultaneously accommodate the needs of both WCDs, then the controller 312 can the allocate the downlink resource block to both WCDs at the same time. In particular, if the transmission bit rate that can be supported on the respective downlink to each of the two particular WCDs is more than each WCD requires, such that allocating the downlink resource block to just one of the WCDs would result in unused transmission capacity, then shared allocation can avoid inefficient used of transmission capacity.

For instances in which the controller 312 does allocate a downlink resource block to two WCDs, the buffer 310 may be caused to direct an output data stream 316 to the bit-stream blender 314. More particularly, the data stream 316 can contain data bound for transmission to two particular WCDs. In accordance with example embodiments, the data for each WCD could be in the form of a bit stream, and the bit-stream blender 314 can blend the bit streams into a blended bit stream 318 that can then be modulated and transmitted in one or more resource elements of the commonly-allocated downlink resource block. As described below, each of the two WCDs can subsequently demodulate the data in the common-allocated downlink resource block and recover its respective bit stream.

In one example, the bit-stream blender 314 can operate by subdividing each respective bit stream in the data stream 316, and interleaving the subdivided portions to from the blended bit stream 318. By coordinating the subdivision and interleaving with the scheduling function of the controller and with the pre-adjusted (and adjustable) modulation scheme used on various sub-carriers of the OFDM transmitter 302, the bit-stream blender 314 can ensure that the blended bit stream 318 can be modulated and transmitted in such a way that facilitates separation of the blended bit streams upon demodulation by the receiving WCDs. More particularly, the subdivided, interleaved bit-stream portions can be arranged so a different mode of modulation is applied to individual bit streams that make up the blended bit stream. The bit-stream blender 314 could be implemented using hardware, software, and/or firmware. In some implementations, bit-stream blender 314 could be part of controller 312.

For instances in which the controller 312 allocates a downlink resource block for just one WCD, modulation and transmission may be carried out conventionally. Thus, the buffer 310 may be caused to direct conventional output data stream 320 to the OFDM transmitter 302. In this case, the conventional output data stream 320 can be a bit stream carrying data for just one WCD, and the OFDM transmitter 302 can correspondingly modulate the data for the WCD. In accordance with example embodiments, the OFDM transmitter 302 could, however, modulate and transmit the data in the same way, regardless of whether or not a downlink resource block has been allocated for two or just one WCD. In other words, sharing of downlink resource blocks—or of downlink resource elements in a shared downlink resource block—can be transparent to operation of the OFDM transmitter 302. Further details of OFDM transmitter operation are described below.

Figure 4:
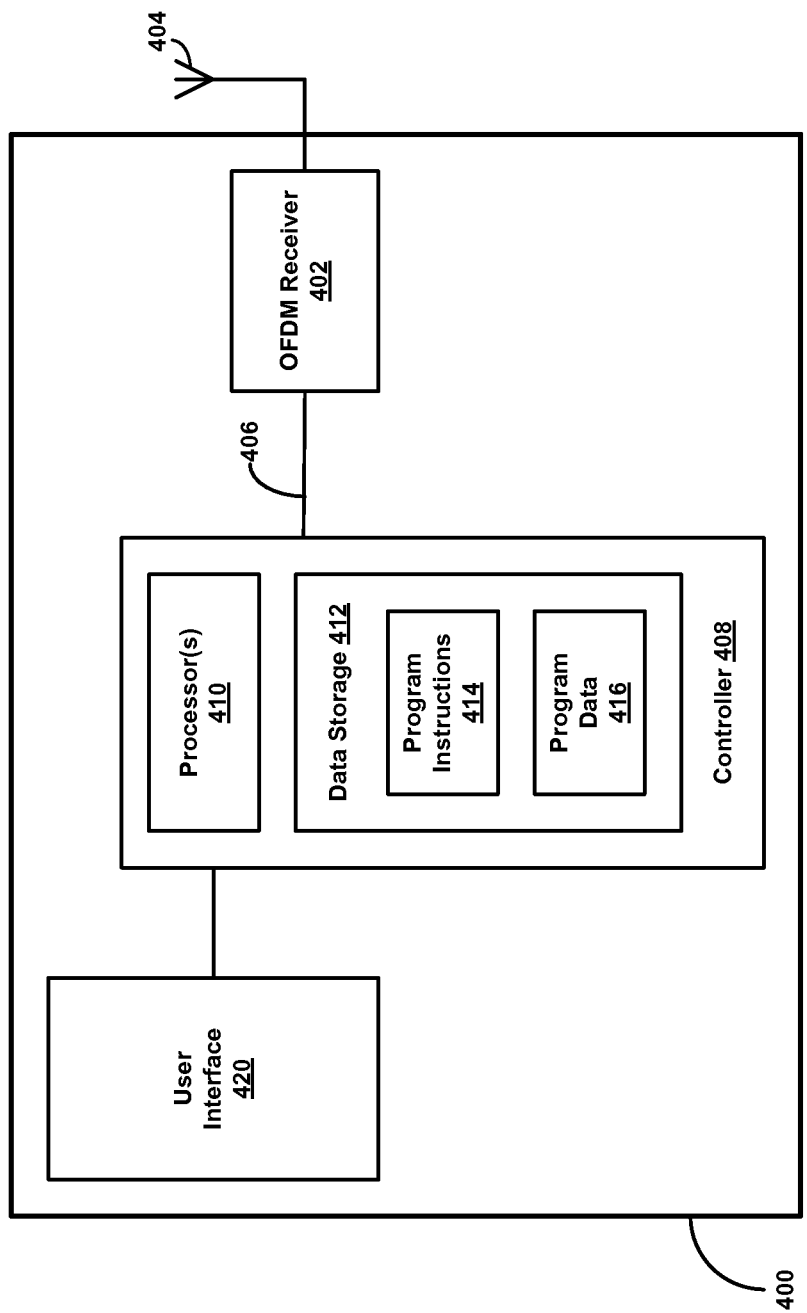
FIG. 4 is a functional block diagram of a WCD, in accordance with an example embodiment.

FIG. 4 is a functional block diagram of an example WCD 400. WCD 400 could, for example, correspond to any of WCDs 116-122 shown in FIG. 1. For purposes of illustration, WCD 400 will be described as using OFDM and downlink resource blocks as shown in FIGS. 2A and 2B. It is to be understood, however, that other types of air interfaces could be used.

As shown in FIG. 4, WCD 400 includes an OFDM receiver 402 for receiving downlink communications from an OFDM communication system, such as base station 300, via one or more antennas, exemplified in FIG. 4 by antenna 404. The downlink communications could include downlink data contained in one or more downlink resource blocks. The downlink communications could also include control signaling, such as messages used to allocate downlink resource blocks to WCD 400 and assign a modulation mode to WCD 400. WCD 400 could also include an OFDM transmitter (not shown) for transmitting uplink communications via antenna 404.

The OFDM receiver 402 could function to recover data from OFDM symbols, for example, by performing the reverse of the operations performed by OFDM transmitter 302. As described in detail below, the OFDM receiver 402 may receive an OFDM symbol spanning K sub-carriers, obtain time-domain samples of the OFDM symbol, and provide the time-domain samples in parallel to a Fast Fourier Transform (FFT) module. The FFT module outputs the K sub-carriers of the OFDM symbol, with each sub-carrier including a respective sub-carrier symbol. OFDM receiver 402 may then demodulate the sub-carriers to recover the data represented by the sub-carrier symbols. The data from the sub-carriers may be serialized to provide an output data stream 406.

WCD 400 may also include a controller 408 that is configured to control the functioning of WCD 400. Controller 408 could be implemented using hardware, software, and or firmware. In one example, controller 408 includes one or more processors 410 and data storage 412. Data storage 412 could be any type of non-transitory computer readable medium, such as volatile and/or non-volatile memory. Data storage 412 may store program instructions 414 and program data 416. Program instructions 414 may be executable by processor(s) 410 to cause WCD 400 to perform operations, such as any of the operations described below with reference to FIG. 13. For example, program instructions 414 may include instructions for receiving an assignment of modulation mode to recover data for WCD 400 from demodulated data that is included in output data stream 406. Program data 416 could include any data that is generated or used in connection with the execution of any of program instructions 414.

In some examples, program instructions 414 also include an operating system, communications protocols for communicating using LTE or some other type of air interface, and one or more applications that can be accessed by a user of WCD 400. Such applications could include a voice application for VoIP communications, an email application for email communications, a text application for text-based (SMS) communications, a Web application for accessing Web servers, and/or a media application for receiving streaming media from a media server. Other types of applications are also possible.

The data recovered from output data stream 406 could be provided as input to one or more of such applications. Thus, the data recovered from output data stream 406 could include voice data that is provided to a voice application, Web data that is provided to a Web application, streaming media that is provided to a media application, etc.

Some of the applications may be configured to use a user interface 420 in WCD 400. User interface 420 is configured to receive input from the user and to convey output from the user. For instance, user interface 420 may include a touch screen, a keypad, buttons, and or other controls for receiving input from the user. User interface 420 may also include a display screen for displaying textual and/or graphical information to the user. In addition, user interface 420 may include a microphone and speaker for voice communication.

2. EXAMPLE OPERATION

Shared allocation of downlink resource blocks for transmission of data to WCDs can be illustrated by considering example operation.

Figure 5:
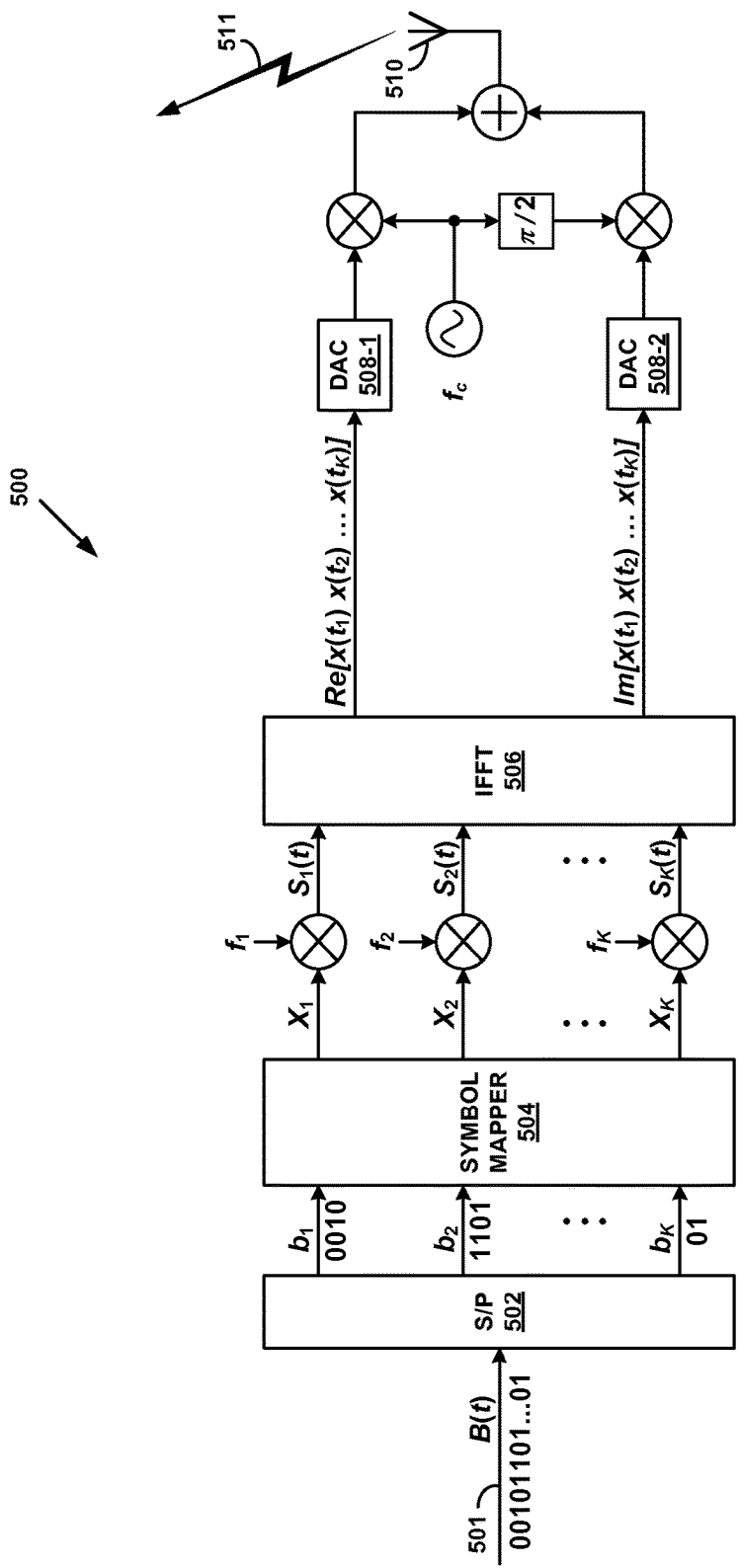
FIG. 5 is a functional block diagram of an OFDM transmitter, in accordance with an example embodiment.

FIG. 5 is a functional block diagram of an OFDM transmitter 500 that illustrates how a data stream 501 may be processed for transmission, according to an example embodiment. The OFDM transmitter 500 could correspond to the OFDM transmitter 302 in FIG. 3, for example. The data stream 501 could be a blended bit stream for transmission to two WCDs, such as the blended bit stream 318. Alternatively, data stream 501 could be a data stream, such as the conventional output data stream 320 carrying data for just one WCD. The illustration in FIG. 5 can be taken to represent a snapshot of operation during a time interval equal to one "symbol time," $T_{symbol}$, in which one OFDM symbol is generated from multiple frequency components carried on K sub-carriers.

The data stream 501 is represented as a serial bit stream in time B(t), where B is the bit value (0 or 1) and t is time. For purposes of illustration, only a portion of B(t) is depicted, with example bit values "00101101 . . . 01," where the ellipses represent additional, intervening bits in the serial stream. The particular values in the depiction are arbitrary, serving only to illustrate example operation. Also, in FIG. 5, time t in B(t) increases toward the right, so that bits "00" on the left in the example data stream 501 arrive at the transmitter at earlier times than the "01" bits that follow to the right of the ellipses.

In OFDM transmitter 500, data stream 501 is received by a Serial-to-Parallel (S/P) converter 502, where the serial data are divided into K parallel bit sub-streams for modulation onto K sub-carriers. The parallel bit sub-streams of data are identified as, $b_1, b_2, \ldots, b_K$, where the ellipses represent bit sub-streams between $b_2$ and $b_K$, not shown for the sake of brevity in FIG. 5. By way of example, $b_1$ contains the four leading bits 0010 of B(t), $b_2$ contains the next four bits 1101, and $b_K$ contains the last two bits 01 of B(t). As described below, the number of bits in each bit sub-stream corresponds to the number of bits that can be modulated onto the particular sub-carrier to which each bit sub-stream is directed, which, in turn corresponds to the number of bits per symbol. For each sub-carrier, the number of bits per symbol may depend, at least in part, on RF conditions affecting the particular sub-carrier at or near the time the transmission is scheduled. Since RF conditions can vary with time, the number bits per symbol supported by any given sub-carrier can correspondingly vary with time. As noted above, under LTE, the sub-carriers assigned to a given user typically use the same modulation scheme, and thus carry the same number of bits per symbol, during a given symbol time.

In accordance with example embodiments, the parallel bit sub-streams are input to a symbol mapper 504, which maps each respective bit sub-stream to a respective modulation symbol according to a respective modulation scheme appropriate for the number of bits in the respective bit sub-stream. By way of example, and to illustrate the use of possibly different modulation schemes on different sub-carriers, the four-bit sub-streams $b_1$ and $b_2$ will each be mapped using 16-QAM and the two-bit sub-stream $b_K$ will be mapped using QPSK. These and/or other modulation schemes could be used for the other bit sub-streams not shown in the FIG. 5. For example, 64-QAM can be used to map a six-bit sub-stream to a 64-QAM symbol, and 256-QAM can be used to map an eight-bit sub-stream to a 256-QAM symbol. Other modulation schemes could be used as well. As noted, the number of bits in each of the K sub-streams can be adjusted by a controller/scheduler based on RF conditions, for example.

The output of the symbol mapper 504 are K data symbols, labeled $X_1, X_2, \ldots, X_K$, each corresponding to a modulation-mapping of a respective input bit sub-stream. As shown in FIG. 5, each respective data symbol is then modulated by a respective one of the K sub-carriers $f_1, f_2, \ldots, f_K$ to generate a corresponding one of K sub-carrier data symbols $S_1(t), S_2(t), \ldots, S_K(t)$. Each sub-carrier data symbol $S_n(t)$, $n=1, \ldots, K$, is a different one of the $X_n$, $n=1, \ldots, K$, modulated at each of K consecutive sample times by a respective one of the K sub-carrier frequencies. Thus, each sub-carrier data symbol $S_n(t)$ in FIG. 5 corresponds to a stream of K time samples, and the K sub-carrier data symbols $S_1(t), S_2(t), \ldots, S_K(t)$ constitute K concurrent, parallel streams.

In practice, the modulation process multiplies each respective data symbol $X_n$ by a respective sinusoidal function of both a respective one of the frequencies $f_1, f_2, \ldots, f_K$ and time at each of K evenly-spaced time steps, or "sampling times," spanning one unit of $T_{symbol}$. In accordance with example embodiments, each sub-carrier frequency is an integer multiple of a fundamental baseband frequency $f_0=1/T_{symbol}$, so that $f_1=1\times f_1$, $f_2=2\times f_0, \ldots, f_K=K\times f_0$. The integer-multiple relation of the sub-carrier frequencies $f_k=k\times f_0$, $k=1, \ldots, K$, makes the set of the K sub-carriers (and the K sinusoidal modulation functions) orthogonal. The sampling times are given by $t_n=n\times \Delta t$, $n=1, \ldots, K$, where the sampling time step $\Delta t$ is given by $\Delta t=T_{symbol}/K$.

In accordance with example embodiments, at sample time $t_n$ the sinusoidal function with sub-carrier frequency $f_k$ can be expressed as $\exp(-j2\pi f_k t_n)=\cos(2\pi f_k t_n)-j \sin(2\pi f_k t_n)$, where $j=\sqrt{-1}$. With $f_k$ and $t_n$ defined as above, the sinusoidal function can be rewritten in the simpler and more computationally convenient form of $\exp(-j2\pi nk/K)$.

For the example LTE system described above, $\Delta f=15$ kHz, which corresponds to the bandwidth of each sub-carrier. The symbol time is therefore $T_{symbol}=66.7$ microseconds (μs) However, other bandwidths and corresponding sampling time steps could be used. As noted above, the size of each time step $\Delta t$ depends on the total number of samples K according to the relation $\Delta t=T_{symbol}/K$. For example, for a total bandwidth of 1.4 MHz, K=128; for a total bandwidth of 3 MHz, K=256; and for a total bandwidth of 20 MHz, K=2048. Note that LTE can support total bandwidths of 5, 10 and 15 MHz as well, with K=512, 1024, and 1536, respectively.

Continuing with the example operation illustrated in FIG. 5, an OFDM symbol is formed from the K sub-carrier data symbols $S_1(t), S_2(t), \ldots, S_K(t)$ of one symbol time $T_{symbol}$ by processing the sub-carrier data symbols through an Inverse Fast Fourier Transform (IFFT) module 506, which generates a set of K time-domain digital samples $x(t_n)$, where, again, $t_n=n\times\Delta t$, $n=1, \ldots, K$. Each digital sample $x(t_n)$ now corresponds to a superposition of sub-carrier frequency components at one of the sample time. Thus, whereas each of the sub-carrier data symbols $S_1(t), S_2(t), \ldots, S_K(t)$ is carried on an individual sub-carrier, the resulting OFDM symbol spans the K sub-carriers and is serialized in time. That is, in addition to computing an inverse Fourier transform on the K sub-carrier data symbols, the IFFT module 506 also acts as a parallel-to-serial converter, converting the K parallel streams to the time-serial stream $x(t_n)$.

As described in more detail below, each of the $X_1, X_2, \ldots, X_K$ data symbols is a complex number, having a real part and an imaginary part. Therefore, each of the K sub-carrier data symbols $S_1(t), S_2(t), \ldots, S_K(t)$ is a stream of complex numbers, and the K time-domain digital samples $x(t_n)$, $n=1, \ldots, K$, output by the IFFT module 506 are also complex numbers. In accordance with example embodiments, the real and imaginary parts of $x(t_n)$, $n=1, \ldots, K$, can be output in two separate streams of digital samples. This is indicated in FIG. 5, where the real part of the digital sample stream is labeled $Re[x(t_1) x(t_2) \ldots x(t_K)]$, and the imaginary part is labeled $Im[x(t_1) x(t_2) \ldots x(t_K)]$.

Each of the two digital streams is then converted to a respective analog signal, and both analog signals are up-converted to a common carrier frequency $f_c$, but with a relative phase offset of 90° between the two up-converted signals. By way of example in FIG. 5, the real part of the digital sample stream is converted to an analog signal by the digital-to-analog converter (DAC) 508-1, and the imaginary part is converted to an analog signal by the digital-to-analog converter (DAC) 508-2. The up-conversion is achieved by multiplying each analog signal by a carrier signal of frequency $f_c$, but with a different one of two 90°-offset phases (indicated as π/2 in the figure). For example, one phase of the carrier signal can be sine of $f_c$ and time, and the other phase can be a cosine of $f_c$ and time. The two up-converted analog signals are then added, and the summed signal is transmitted in the signal 511 by the antenna 510 of the OFDM transmitter 500, as illustrated.

The OFDM symbol formed during one symbol time $T_{symbol}$ as described above is a frequency superposition of all the K symbols output by the symbol mapper 504, and thus spans all the K sub-carriers of a given OFDM downlink. In conventional operation under LTE, the smallest unit of resources that is allocated to a WCD at any one time is one downlink resource block. As noted above, this allocation unit spans 12 sub-carriers and seven OFDM symbol times (one slot). In general, the total number of sub-carriers transmitted is larger than the 12 of one downlink resource block. That is, typically K>12. For example, in a 1.4-MHz bandwidth mode, six resource blocks are transmitted in each slot. This corresponds to 72 sub-carriers (as described below, K can exceed the number of sub-carriers that are actually transmitted).

Allocation of a particular downlink resource block to a given WCD can therefore correspond to allocating a particular sequence of 12 consecutive sub-carriers out of the K total sub-carriers. However, the given WCD will receive all the transmitted sub-carriers, and will use them all to demodulate the received signal, as described below. After demodulation, the WCD can retain only the resource elements corresponding to the 12 consecutive sub-carriers of its allocated downlink resource block (as well as any others from possibly other allocated resource blocks). In this sense, at least one sequence of 12 consecutive sub-carriers among the K sub-carriers $f_1, f_2, \ldots, f_K$ illustrated in FIG. 5 belongs to one downlink resource block. In accordance with example embodiments, and as will be described below, one or more sub-carriers of a given resource block can, unlike under conventional operation, be allocated simultaneously to two WCDs.

Referring again to FIGS. 2A and 2B, one OFDM symbol carries a frequency superposition of all the resource elements scheduled for transmission during a given symbol time. As such, one OFDM symbol can span the resource elements of all the resource blocks during the given symbol time. The procedure represented in the snapshot illustrated in FIG. 5 above can be repeated at successive symbol times, such that for LTE, every seven consecutive OFDM symbol transmissions aligned with a given slot boundary span, in frequency and time, all the resource blocks of the given single slot. Similarly, every 14 consecutive OFDM symbol transmissions aligned with a given sub-frame boundary span, in frequency and time, all the resource blocks of the given single sub-frame, and so on.

Note that it is sometimes customary to refer one OFDM symbol as spanning just the 12 sub-carriers of a single given resource block. This can be a convenient way of descriptively associating OFDM symbols with individual resource blocks. However, at a computational level, the IFFT superposition is still carried out over all the sub-carriers of the downlink air interface, which can include sub-carriers above and below (in frequency space) the sub-carriers of the given resource block.

Although not necessarily shown in FIG. 5, each OFDM symbol formed as described above can also include a cyclic prefix to help mitigate inter-symbol interference that may be caused by multipath propagation during transmission. Under LTE, a cyclic prefix can be formed by duplicating the last P of the K time-domain digital samples $x(t_n)$, n=1, ..., K, output by the IFFT and pre-pending them to beginning of the OFDM symbol. The resulting OFDM symbol plus cyclic prefix will be of slightly longer duration than the symbol time $T_{symbol}$. More particularly, one 0.5-ms slot divided by seven OFDM symbols per slot corresponds to approximately 71.4 is per OFDM symbol in time. As noted above, $T_{symbol}=1/\Delta f=66.7$ μs. The difference of approximately 4.8 is corresponds to the cyclic prefix added to each OFDM symbol prior to analog conversion and transmission. In practice, the cyclic prefix pre-pended to the first OFDM symbol of a slot is slightly longer than that pre-pended to the following six OFDM symbols of the slot. This can help distinguish the slot boundary for a device (e.g. a WCD) that receives the transmission.

While the number K of time samples per symbol time is the same as the number K of sub-carriers, not all of the sub-carriers are necessarily used in transmission of each OFDM symbol under LTE, even though all K time samples of the time-domain digital samples $x(t_n)$, n=1, ..., K are generated and converted to an analog signal for transmission. In addition, not all of the transmitted sub-carriers are necessarily associated with resource blocks. For example, for the 1.4-MHz channel bandwidth mode of LTE, only 76 of K=128 sub-carriers are transmitted, 72 of them associated with six resource blocks (6×12=72). Thus, the 76 transmitted sub-carriers, each 15 kHz wide, occupy approximately 1.14 MHz of the 1.4 MHz available for transmission. Mathematically, this is equivalent to setting 52 of the symbol values $X_n$, n=1, ..., 128, equal to zero (where 76=128−52). The omitted 52 sub-carriers can serve as guard sub-carriers, since the frequency space that would be occupied if they were transmitted is instead empty. Similarly, for the 3-MHz channel bandwidth mode of LTE, only 151 of K=256 sub-carriers, occupying 2.265 MHz of the available 3 MHz, are transmitted; 105 sub-carriers serve as guard sub-carriers. The 5, 10, 15 and 20-MHz modes also utilize guard sub-carriers. Note that for purposes of illustration, and without loss of generality, FIG. 5 (and other figures herein that similarly represent sub-carriers) depicts all K sub-carriers as if all are transmitted.

In order to help illustrate how one or more (or all) resource elements of a downlink resource block can be shared by two WCDs, it is useful to examine example symbol modulation schemes in more detail. The process of symbol modulation maps a block of bits to one of a discrete set of symbol positions in a complex modulation plane. An "in-phase" (or just "I") component of the symbol is mapped to a discrete position along the real axis, or I-axis, of the complex modulation plane, and a "quadrature" (or just "Q") component of the symbol is mapped to a discrete position along the imaginary axis, or Q-axis, of the complex modulation plane. Each symbol position can therefore be represented as a complex number, having a real I-component value and an imaginary Q-component value in the complex modulation plane. The set of discrete symbol positions in the modulation plane is referred to as a "constellation." The total number N of constellation points is typically determined as $N=2^b$, where b is the number of bits that can be represented in any given symbol of the constellation. For example, for QPSK, b=2 and N=4; for 16-QAM, b=4 and N=16; and for 64-QAM, b=6 and N=6.

Figure 6:
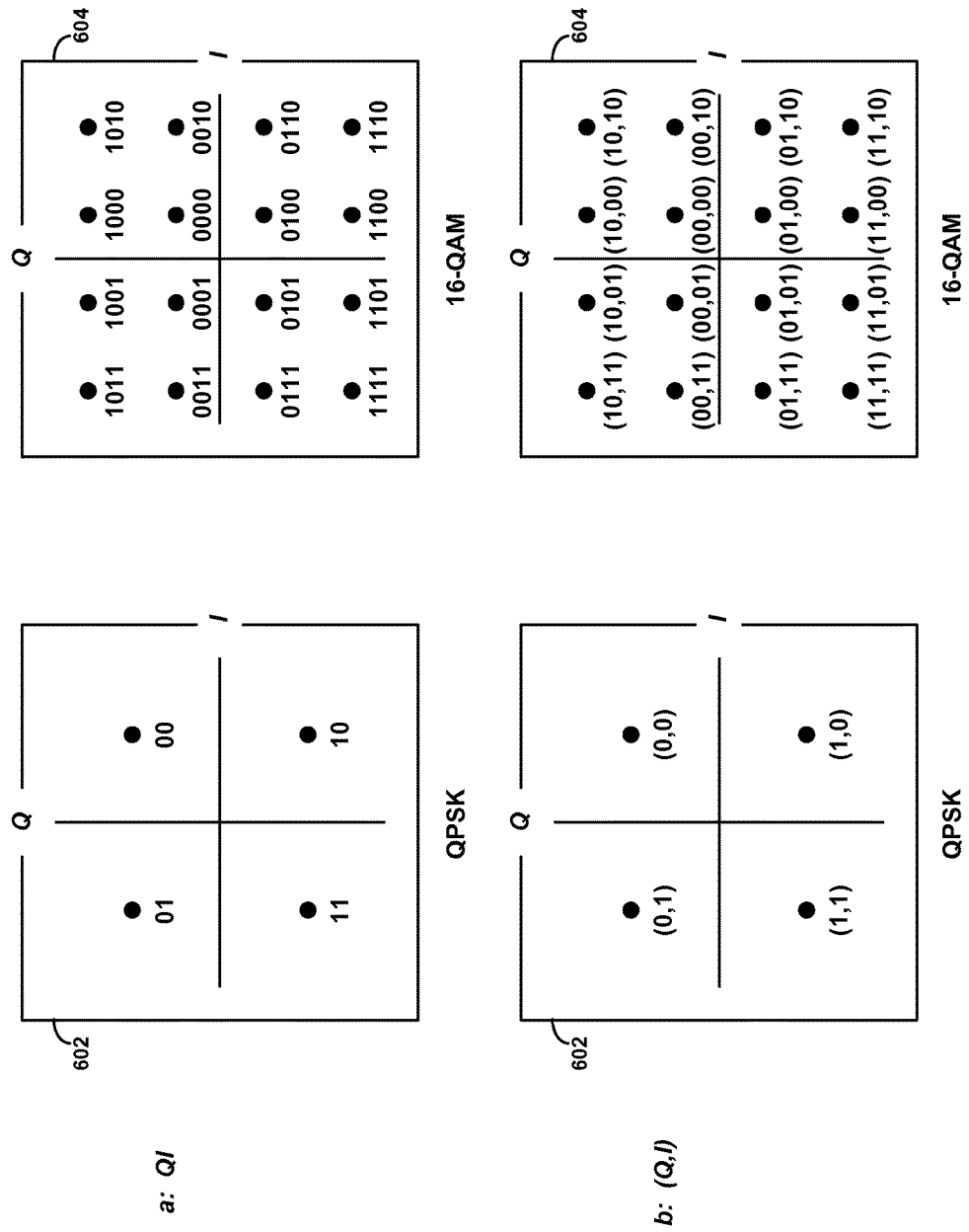
FIG. 6 is a conceptual illustration of data symbol representation in QPSK and 16-QAM, in accordance with an example embodiment.

FIG. 6 shows two ways of labeling the I- and Q-components for example constellations of QPSK and 16-QAM. As shown in the figure, a QPSK constellation 602 has four symbol positions representing the four possible numbers that can be formed from two bits. In the top panel (labeled "a"), each of the four numbers is represented as a concatenation of a 1-bit Q-component and a 1-bit I-component: 00, 01, 10, and 11, or more generally QI. In the bottom panel (labeled "b"), each of the four numbers is represented in a rectangular-coordinate form of the I- and Q-components: (0,0), (0,1), (1,0), and (1,1), or more generally (Q,I). The two representations are equivalent, but the second, (Q,I), can be more convenient for illustrating sharing downlink resource elements, as described below.

A similar description applies to the 16-QAM constellation 604 in FIG. 6. In this case, 16 symbol positions represent the 16 possible numbers that can be formed from four bits. In the top panel, each of the 16 numbers is again represented as a concatenation, this time of a 2-bit Q-component and a 2-bit I-component: 0000, 0001, 0010, ..., 1111, or more generally QI (where the ellipses represent intervening 4-bit numbers). In the bottom panel (labeled "b"), each of the 16 numbers is again represented in a rectangular-coordinate form of the I- and Q-components: (00,00), (00,01), (00,10), ..., (11,11), or more generally (Q,I). Again, the two representations are equivalent.

The above description can be extended to 64-QAM (8×8 constellation) and 256-QAM (16×16 constellation), and similar concepts can be applied to other types of constellations. In both of the above examples, as well as other QAM modulation schemes (e.g., 64-QAM, etc.), the I and Q axes are orthogonal. As a result, the I- and Q-components of a given symbol can be modulated separately, and do not interfere with one another upon transmission.

It should be noted that the particular bit assignments of the I- and Q-components in each the constellations 602 and 604 in FIG. 6 represent just one possible set of such assignments, and that others are possible, so long as each constellation point is assigned a unique bit pattern from among the possible bit patterns.

Figure 7:
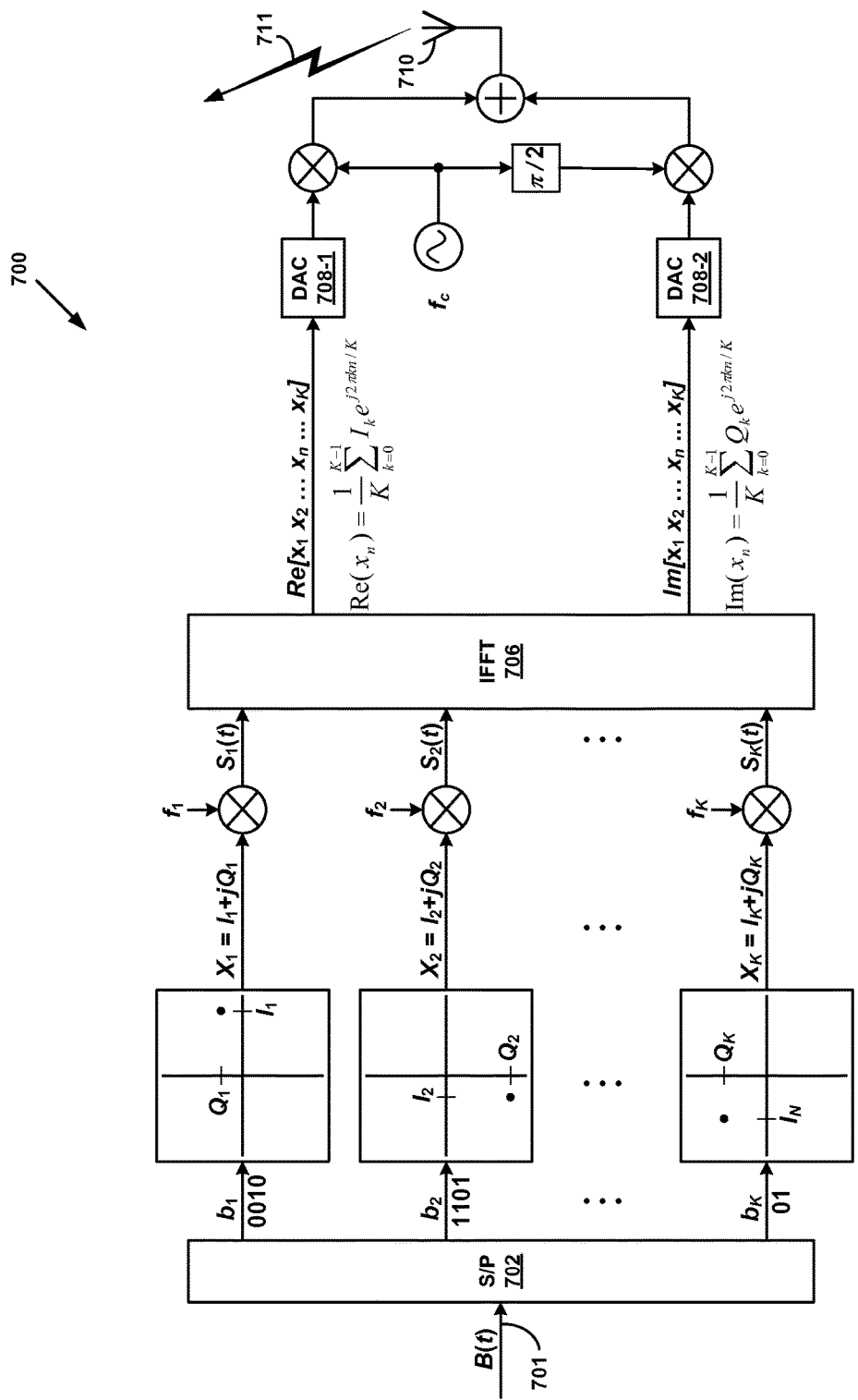
FIG. 7 is a functional block diagram of an OFDM transmitter showing certain aspects relating to orthogonal modulation, in accordance with an example embodiment.

FIG. 7 is a functional block diagram of an OFDM transmitter 700 analogous to the OFDM transmitter 500 in FIG. 5, but with a symbol mapper represented conceptually by a set of complex modulation planes. This version of an OFDM transmitter illustrates additional details of the modulation and transmission process. As shown, a data stream 701, represented as a serial bit stream B(t), is input to a S/P converter 702. For purposes of illustration, B(t) is taken to be the same as that shown in FIG. 5. The serial data are divided into K parallel bit sub-streams $b_1, b_2, \ldots, b_K$, and each is then mapped to a respective constellation symbol for modulation onto K sub-carriers.

In this example, the bit streams $b_1$ and $b_2$ are each four bits in length, and are therefore modulated using 16-QAM; the bit stream $b_K$ has two bits, and is therefore modulated using QPSK. Referring again to FIG. 6, $b_1=0010$ is mapped to the 0010 symbol position in the 16-QAM modulation plane modulation. The resulting complex symbol can be written as $X_1=I_1+jQ_1$, where $I_1$ and $Q_1$ are the I- and Q-components and $j=\sqrt{-1}$. Similarly, $b_2=1101$ is mapped to the 1101 symbol position in the modulation plane modulation, and the resulting complex symbol can be written as $X_2=I_2+jQ_2$, where $I_2$ and $Q_2$ are the I- and Q-components. As shown, $b_K=01$ is mapped to the 01 symbol position in the QPSK modulation plane modulation, and the resulting complex symbol can be written as $X_K=I_K+jQ_K$, where $I_K$ and $Q_K$ are the I- and Q-components. A similar process is carried out for the intervening bit streams (represented by vertical ellipses in FIG. 7).

As described above, each of the respective data symbols is modulated onto a respective one of the K sub-carriers $f_1, f_2, \ldots, f_K$ to generate a corresponding one of K sub-carrier data symbols $S_1(t), S_2(t), \ldots, S_K(t)$, and the sub-carrier data symbols are then processed through the IFFT module 706, which generates the set of K time-domain digital samples $x(t_n)$, where, as before, $t_n=n \times \Delta t$, $n=1, \ldots, K$. Writing $x(t_n)$ as simply $x_n$, the real and imaginary parts of $x_n$, $n=1, \ldots, K$, can again be output in two separate streams of digital samples, now labeled in FIG. 7 as $\text{Re}[x_1 \ x_2 \ldots x_n \ldots x_K]$ and $\text{Im}[x_1 \ x_2 \ldots x_n \ldots x_K]$. The form of $x_n$ can be expressed in terms of superpositions of the I- and Q-components determined by the respective symbol mappings of the K bit streams. Specifically:

$$\text{Re}(x_n) = \frac{1}{K} \sum_{k=0}^{K-1} I_k e^{j2\pi kn/K}$$

and $$\text{Im}(x_n) = \frac{1}{K} \sum_{k=0}^{K-1} Q_k e^{j2\pi kn/K}.$$

In this form, the superposition of frequency components at each time step $t_n$ is explicitly represented by the sum over k. The remaining operations, namely analog conversion with DAC 708-1 and 708-2, up-conversion to the carrier frequency $f_c$, and transmission of the signal 711 by the antenna 710 are generally the same as the analogous operations described above for the OFDM transmitter 500.

Figure 8:
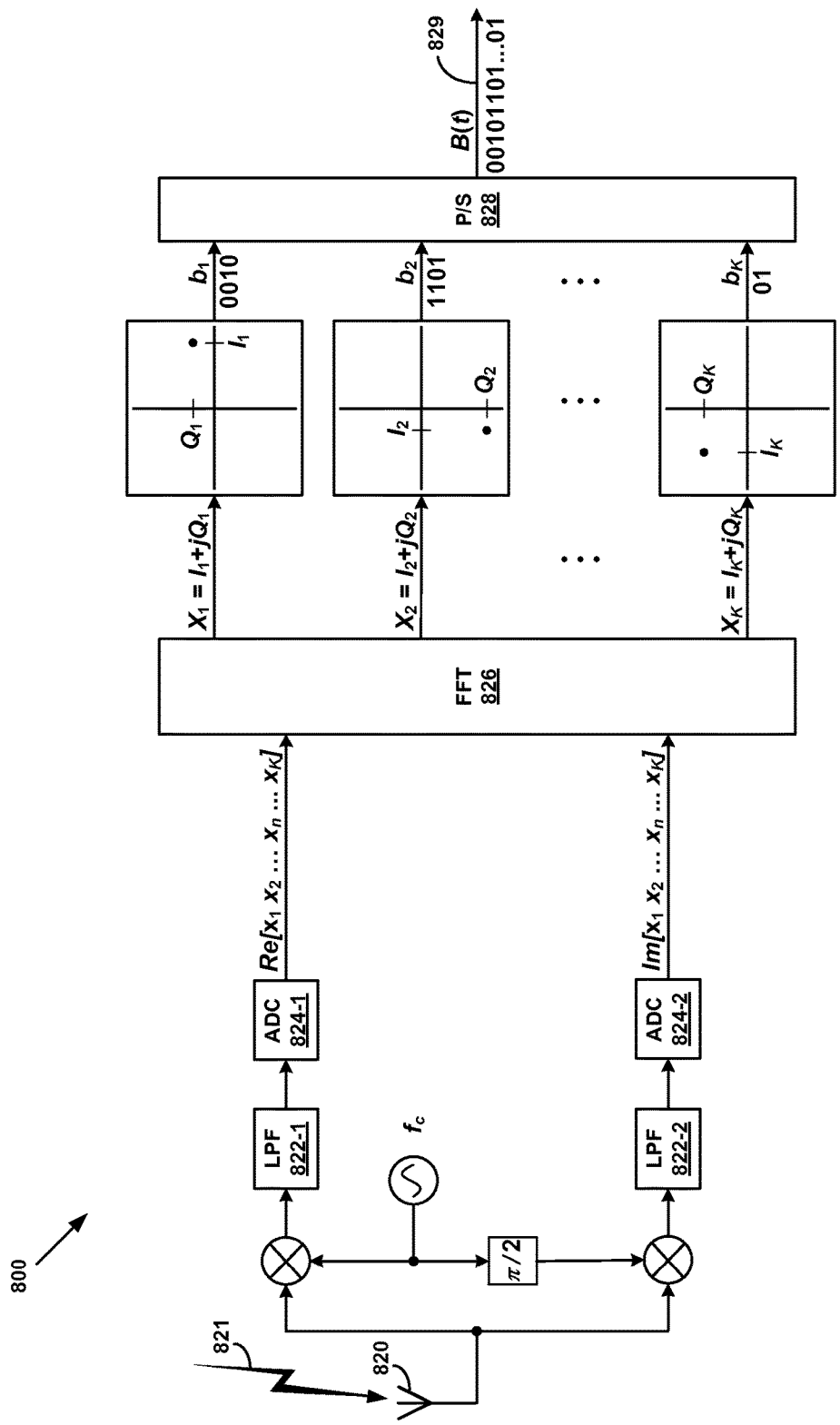
FIG. 8 is a functional block diagram of an OFDM receiver showing certain aspects relating to orthogonal modulation, in accordance with an example embodiment.

FIG. 8 is a functional block diagram of an OFDM receiver 800 showing further details of reception and OFDM demodulation, in accordance with an example embodiment. The OFDM receiver 800 could correspond to the OFDM receiver 402 in FIG. 4, for example. The operation illustrated in FIG. 8 is somewhat idealized in the sense that potential degrading effects such as noise and multipath transmission are ignored for the moment. In practice an OFDM receiver, such as the one in FIG. 8, can include additional components and procedures for mitigating these effects (e.g., cyclic prefixes, error correction, etc.).

As shown, an analog signal 821 is received by an antenna 820. The received analog signal 821, which could correspond to the transmitted signal 711, for example, is directed onto two different paths, and in simultaneity, the analog signal on each path is multiplied a sinusoidal signal of frequency $f_c$, but with a different one of two 90°-offset phases (indicated as $\pi/2$ in the figure). The process effectively picks out the real component from one signal path (the top path in the FIG. 8) and picks out the imaginary component from the other signal path (the bottom path in the FIG. 8). The real component is passed through a low-pass-filter (LPC) 822-1 that outputs a baseband analog signal of the real component, and the imaginary component is passed through a LPC 822-2 that outputs a baseband analog signal of the imaginary component. The baseband analog signal of the real component is then passed through an analog-to-digital converter (ADC) 824-1 to generate digitized samples of the input signal, labeled in FIG. 8 as $\text{Re}[x_1 \ x_2 \ldots x_n \ldots x_K]$. Similarly, the baseband analog signal of the imaginary component is passed through an ADC 824-2 to generate digitized samples of the input signal, labeled in FIG. 8 as $\text{Im}[x_1 \ x_2 \ldots x_n \ldots x_K]$.

The real and imaginary digital sample streams are then processed through the FFT module 826, which computes and outputs a parallel streams of complex modulation symbols $X_1, X_2, \ldots, X_K$, each on one of the K sub-carriers. This reverses the IFFT processing carried out by the OFDM transmitter, so that $X_1=I_1+jQ_1$, $X_2=I_2+jQ_2$, $\ldots$, $X_n=I_n+jQ_n$, $\ldots$, $X_K=I_K+jQ_K$. Under idealized conditions of perfect (error-free) transmission, the received version of $X_n$ will be the same as the transmitted version. In practice, this will not generally be the case. However, for the purposes of the present illustrative example, the agreement between the received and transmitted modulation symbols will be assumed be sufficient to result in accurate symbol demodulation.

In accordance with example embodiments, each modulation symbol can be demodulated by determining its real (I) and imaginary (Q) components. The symbols are demodulated in parallel to generate K parallel bit streams $b_n$, $n=1, \ldots, K$. This is represented in FIG. 8 by locating each modulation symbol $X_n$ in a respective demodulation plane. Thus, $X_1=I_1+jQ_1$ is demodulated using 16-QAM as the bit sub-stream $b_1=0010$. Similarly, $X_2=I_2+jQ_2$ is demodulated using 16-QAM as the bit sub-stream $b_2=1101$, and $X_K=I_K+jQ_K$ is demodulated using QPSK as the bit sub-stream $b_K=01$. The parallel bit streams are then input to a parallel-to-serial (P/S) converter 828, which generates a serial bit stream 892, represented by B(t). The received serial bit stream B(t)=001011010 . . . 01 will be the same as that transmitted by the OFDM transmitter.

Since input analog signal 821 can contain a continuous stream of frequency superpositions of modulated symbols, precise timing can be used by the OFDM receiver 800 to determine time boundaries of the symbols. In this way, the proper sequences of consecutive samples can be processed to recover serial demodulation symbol sub-streams, resulting bit sub-streams, and reconstructed serial bit streams. Under LTE, every seven consecutive received OFDM symbols aligned with a given slot boundary span, in frequency and time, all the resource blocks of the given single slot. Similarly, every 14 consecutive OFDM symbol transmissions aligned with a given sub-frame boundary span, in frequency and time, all the resource blocks of the given single sub-frame, and so on.

As noted above, in conventional operation under LTE, a given WCD can be allocated one or more downlink resource blocks, each having 12 consecutive sub-carriers. However, a serial bit stream corresponding to one OFDM symbol can correspond to all the K sub-carriers received. In practice, a WCD will only retain the one or more sub-portions of a bit stream that corresponds to the sub-carriers in its one or more allocated downlink resource blocks. The WCD will nevertheless need to apply the FFT processing to all K time samples in $Re[x_1\ x_2\ \ldots\ x_n\ \ldots\ x_K]$ and $Im[x_1\ x_2\ \ldots\ x_n\ \ldots\ x_K]$ during each symbol time in order to recover the respective $X_n$ on the WCD's allocated sub-carriers.

Figure 9:
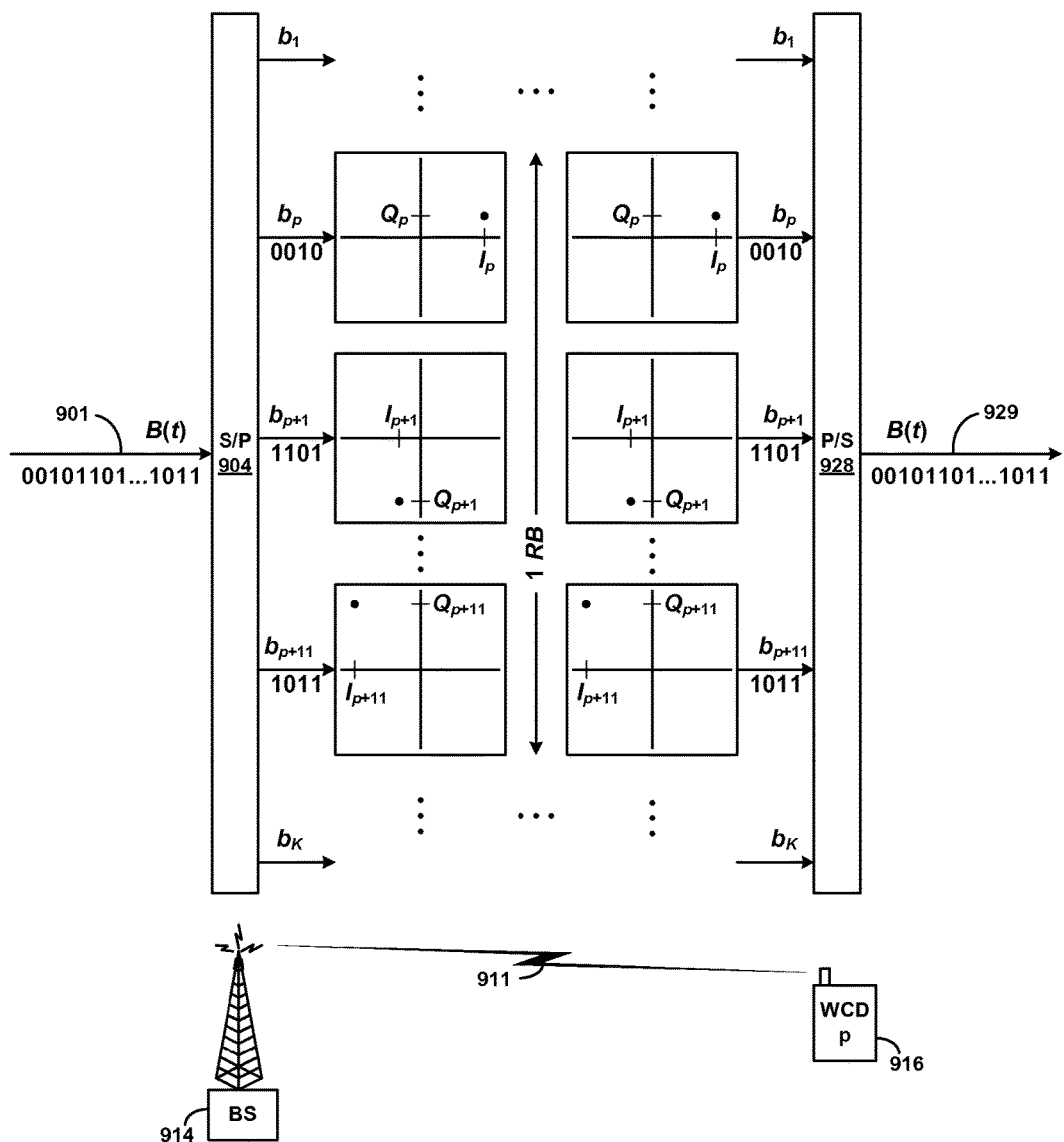
FIG. 9 is a conceptual illustration of an OFDM transmission and reception, in accordance with an example embodiment.

FIG. 9 illustrates a functional summary of OFDM transmission and reception, highlighting aspects related to symbol modulation and demodulation, and also now depicts the sub-carriers of one downlink resource block as a subset of the K total sub-carriers. An OFDM transmitting entity is represented by a BS 914 and an OFDM receiving entity is represented by a WCD-p 916. An air interface 911 between them can carry downlink and uplink communications, such as one or more downlink resource blocks. The transmitting process in FIG. 9 is represented by just a S/P converter 904 and three representative symbol modulation planes; the receiving process in is similarly represented by just a P/S converter 928 and three representative symbol demodulation planes. The vertical ellipses in the figure represent sub-carriers that are not explicitly displayed. The horizontal ellipses between the modulation and demodulation planes represent the other processes of transmission and reception discussed above in connection with FIGS. 7 and 8, for example.

A data stream 901, depicted as serial bit stream $B(t)= \ldots 00101101 \ldots 01 \ldots$, is input to the S/P converter 901, which outputs the parallel bit sub-streams $b_1, \ldots, b_p, b_{p+1}, \ldots, b_{p+11}, \ldots, b_K$ that are then mapped to K respective complex symbols for modulation and transmission on K sub-carriers, as described above. As noted above, under LTE, all of the sub-carriers allocated to a given WCD use the same modulation scheme during any given symbol time. In this example, the bit sub-streams $b_p, b_{p+1}, \ldots, b_{p+11}$ carry data that are modulated using 16-QAM onto 12 sub-carriers of a downlink resource block allocated to the WCD-p 916, where the subscript p corresponds to the "p" designator in the label "WCD-p." A vertical double arrow labeled "1 RB" marks the 12 sub-carriers of the allocated downlink resource block. As shown, $b_p$ contains the first four displayed bits 0010 of B(t), $b_{p+1}$ contains the next four 1101, and $b_{p+11}$ contains the last four displayed bits 1011 of B(t). Explicit bit values for $b_1$ and $b_K$ are omitted for the sake of brevity in the figure, and only the modulation planes for the sub-carriers of the downlink resource block allocated to the WCD-p 916 are shown.

The received analog signal is processed and digitally sampled to recover K complex symbols (not shown), which are then demodulated into the received parallel bit sub-streams $b_1, \ldots, b_p, b_{p+1}, \ldots, b_{p+11}, \ldots, b_K$. The received parallel bit sub-streams are input to the P/S converter 928, which combines them appropriately to produce the received data stream 929. The WCD-p 916 retains and process only the portion of the received serial data stream 929 carried in its allocated downlink resource block (and in any other resource blocks allocated to it).

In conventional operation under LTE, a given downlink resource block can be allocated to only one WCD. This can lead to inefficient utilization of available bandwidth when the data rate supported on the sub-carriers corresponding to a resource block is high enough to simultaneously carry data for two WCDs. More particularly, in this situation, conventional LTE will allocate two resource blocks—one to each of the two WCDs—when a single resource block would be sufficient. The result is an under-utilization of both resource blocks, and hence, of the bandwidth associated with them.

Figure 10:
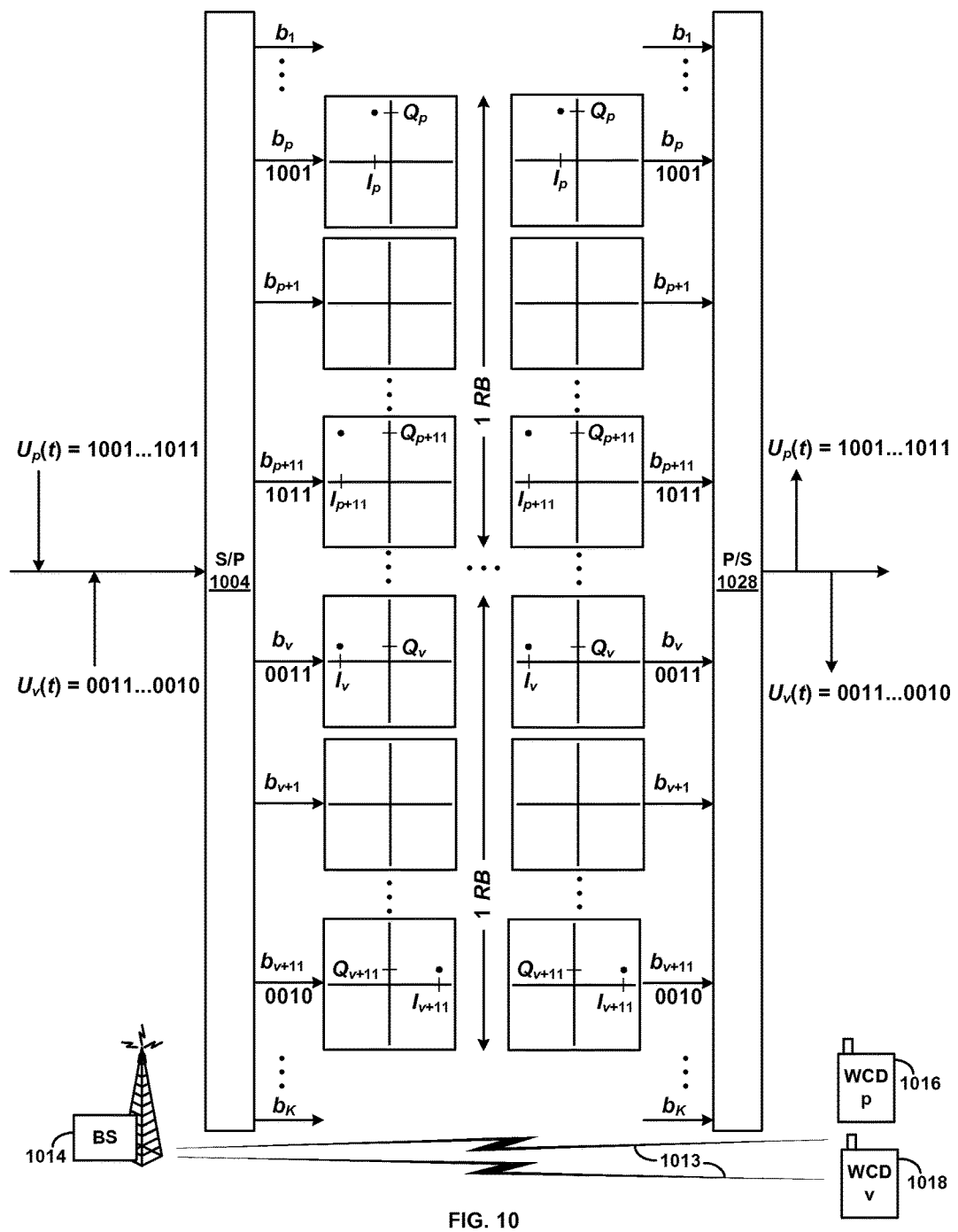
FIG. 10 is a conceptual illustration of an OFDM transmission and reception showing certain aspects of shared allocation of resource blocks, in accordance with an example embodiment.

FIG. 10 illustrates an example of the type of under-utilization that can occur. The operation shown is similar to that in FIG. 9, but now the process is depicted for two WCDs, namely WCD-p 1016 and WCD-v 1018, receiving downlink communications from a BS 1014 via simultaneous transmissions 1013. Each WCD is allocated one resource block, each resource block marked in the figure by a respective vertical double arrow labeled "1 RB." An input data stream now includes a serial bit stream $U_p(t)=$ 1001 ... 1011 for the WCD-p 1016 and a serial bit stream $U_v(t)=0011 \ldots 0010$ for the WCD-v 1018. In this example, $U_p(t)$ precedes $U_v(t)$, and the two together are part of a single serial bits stream 1001 ... 1011 ... 0011 ... 0010, where there can be other, intervening bit streams as well. These two serial bit streams could correspond to the data stream 320 output by the buffer 310 in FIG. 3, for example.

The S/P converter 1004 generates parallel bit sub-streams $b_1, \ldots, b_p, b_{p+1}, \ldots, b_{p+11}, \ldots, b_v, b_{v+1}, \ldots, b_{v+11}, \ldots, b_K$ that are then mapped to K respective complex symbols for modulation and transmission on K sub-carriers. The bit sub-streams $b_p, b_{p+1}, \ldots, b_{p+11}$ carry data that are modulated onto 12 sub-carriers of the downlink resource block allocated to the WCD-p 1016, and the bit sub-streams $b_v, b_{v+1}, \ldots, b_{v+11}$ carry data that are modulated onto 12 sub-carriers of the downlink resource block allocated to the WCD-v 1016. In the example operation, $b_p=1001$, $b_{p+1}$ is left empty, and $b_{p+11}=1011$; and $b_v=0011$, $b_{v+1}$ is left empty, and $b_{v+11}=0010$. Explicit bit values for $b_1$ and $b_K$ are omitted for the sake of brevity in the figure, and only the modulation planes for the sub-carriers of the downlink resource blocks allocated to the WCD-p 1016 and the WCD-v 1018 are shown.

The empty bit sub-streams, $b_{p+1}$ and $b_{v+1}$ in this example, could correspond to sub-carriers for which no data is scheduled during one or more symbol times by the scheduler. The scheduler can make such a determination based on how much data it has to transmit during a given one or more symbol times within a resource block, and the data rate supported on the sub-carriers. Although not explicitly shown in the figure, there could be additional empty sub-carriers in either or both resource blocks. In practice, the scheduler can leave one or more sub-carriers empty when the supported data rate exceeds current transmission needs. Empty sub-carriers during any given symbol time correspond to empty resource elements in a resource block, and hence unused capacity.

For purposes of the present illustration, it is assumed that the data on the sub-carries allocated to both WCDs are modulated using 16-QAM. As described below, the determination of modulation scheme can be based on RF conditions, such that better RF conditions allow for high-order modulation and higher data rates (i.e., more bits per symbol), and vice versa. In this way, an available data rate can exceed what is actually needed at any given time.

With the example arrangement $b_p$=1001 is mapped to 1001 and $b_{p+11}$=1011 is mapped to 1011. The modulation plane of the sub-carrier for the empty bit sub-streams $b_{p+1}$ is left blank to signify that no data are transmitted on this sub-carrier. Similarly, $b_v$=0011 is mapped to 0011 and $b_{v+11}$=0010 is mapped to 0010. The modulation plane of the sub-carrier for the empty bit sub-streams $b_{v+1}$ is left blank, again to signify that no data are transmitted on this sub-carrier. The modulation mappings of these bit sub-streams are perfectly valid. However, they each under-utilize a total amount of available mapping space. Specifically, each of $b_{p+1}$ and $b_{v+1}$ are left empty; there could be additional empty sub-carriers in either or both the two resource blocks shown. Again, these empty sub-carriers represent unused capacity.

The received analog signals are processed and digitally sampled by each WCD to recover K complex symbols (not shown), which are then demodulated into the received parallel bit sub-streams $b_1, \ldots, b_p, b_{p+1}, \ldots, b_{p+11}, \ldots, b_v, b_{v+1}, \ldots, b_{v+11}, \ldots, b_K$. In each WCD, the received parallel bit sub-streams are input to a P/S converter 1028, which combines the parallel bit sub-streams to produce the received serial bit streams $U_p(t)$ and/or $U_v(t)$. The WCD-p 1016 retains and process only $U_p(t)$, and the WCD-v 1018 retains and process only $U_v(t)$.

In accordance with example embodiments, the type of under-utilization and attendant inefficiencies that can result from conventional allocation of any given downlink resource block to just one WCD can be largely reduced or eliminated by a technique that enables the two WCDs to simultaneously share the same downlink resource block. More particularly, a base station (or other network element) can determine when one or more sub-carriers of a downlink resource block can support a data rate sufficient to transmit data to two WCDs at the same time. The approach of this technique is to modulate data for one of the WCDs on the I axis of the complex modulation plan of a sub-carrier, and at the same time modulate data for the other WCD on the Q axis of the complex modulation plan of the same sub-carrier. Since the I and Q axes are orthogonal, the data modulated on each axis can be transmitted simultaneously without interfering with one another.

Figure 11:
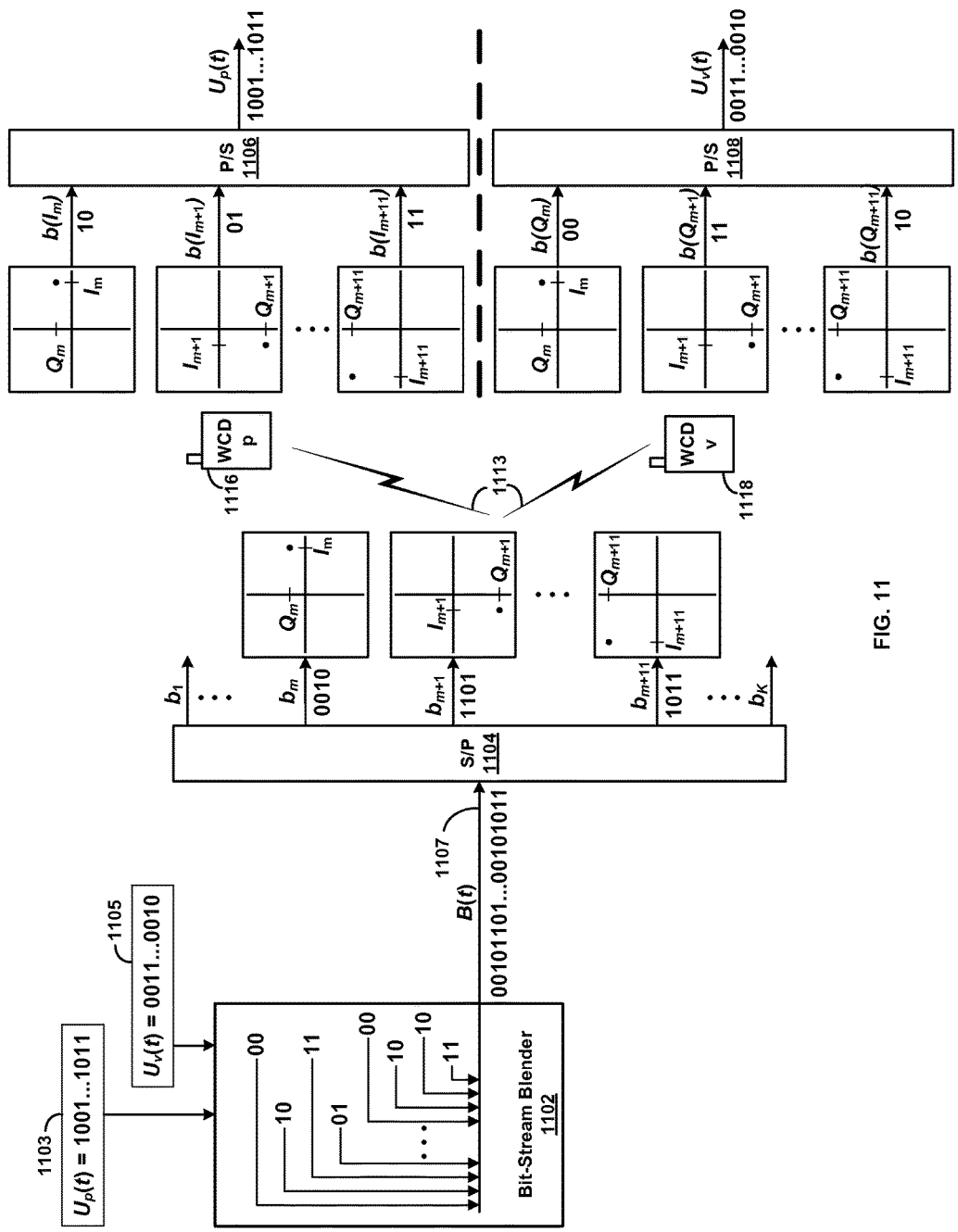
FIG. 11 is a conceptual illustration of an OFDM transmission and reception showing certain further aspects of shared allocation of resource blocks, in accordance with an example embodiment.

FIG. 11 illustrates an example operation of a technique for allocating the sub-carriers of a downlink resource block for simultaneous transmission to two WCDs. In the example, a serial bit stream 1103 for a WCD-p 1116 and a serial bit stream 1105 for a WCD-v 1118 are both input to a bit-stream blender 1102, which could correspond to the bit-stream blender 314 in FIG. 3, for example. By way of example, the same two serial bit streams shown in FIG. 10 serve the present illustration. Namely, the serial bit stream 1102 is given by $U_p(t)$=1001 . . . 1011 and the serial bit stream 1118 is given by $U_v(t)$=0011 . . . 0010. The bit-stream blender 1102 subdivides the two serial bit streams into smaller sub-blocks of bits, and then interleaves the sub-blocks to form a merged or blended serial bit stream 1107 that is input to a S/P converter 1104.

The size of the sub-blocks is the same for each bit sub-stream, and is determined so as to correspond to the number of bits represented on each of the I and Q axes for the particular modulation scheme used. In the example operation, 16-QAM is used for the sub-carriers of the resource block allocated simultaneously to the WCD-p 1116 and WCD-v 1118. Thus the I and Q axes can each encode a 2-bit symbol, so the sub-blocks are each two bits long. For the example shown, interleaving the sub-blocks results in the blended serial bit stream 1107 given by B(t)=001011 01 . . . 00101011. The bit sub-blocks and the interleaving order are indicated in the bit-stream blender 1102. Note that for 64-QAM, the I and Q axes could each encode a 3-bit symbol, so the sub-blocks would each be three bits long. More generally, for M-QAM modulation, where $M=L^2$, and $L=2^N$, the I and Q axes could each encode an N-bit symbol, so the sub-blocks would each be N bits long.

The S/P converter 1104 outputs K parallel bit sub-streams $b_1, \ldots, b_m, b_{m+1}, \ldots, b_{m+11}, \ldots, b_K$ that are then mapped to K respective complex symbols for modulation and transmission on K sub-carriers, as described above. The bit sub-streams $b_m, b_{m+1}, \ldots, b_{m+11}$ carry data that are modulated onto 12 sub-carriers of a downlink resource block allocated concurrently to both the WCD-p 1116 and WCD-v 1118; the subscript m is used to signify that the resource block is not allocated exclusively to either WCD. As shown, $b_m$=0010, $b_{m+1}$=1101, and $b_{m+11}$=1011. Note that $b_{m+11}$ carries the last four bits of the bit stream 1107. Also, explicit bit values for $b_1$ and $b_K$ are again omitted for the sake of brevity in the figure, and only the modulation planes for the sub-carriers of a downlink resource block allocated to the WCD-p 1116 and WCD-v 1118 are shown.

By assigning each of WCD-p 1116 and WCD-v 1118 a different one of the I or Q axes, the I- and Q-components of any given complex symbol can, in effect, be made to carry a different sub-set of the symbol's bits for each WCD. This can be illustrated with reference again to FIG. 6—specifically, the bottom panel—which represents constellation symbols as rectangular coordinate values Q and I. For example, $b_m$=0010 can be seen as mapping to (00,10). With the WCD-p 1116 assigned the I axis and the WCD-v 1118 assigned the Q axis, the value I=10 is directed to the WCD-p 1116 and the value Q=00 is directed to the WCD-v 1118. This correctly corresponds to the first two bits of each of $U_p(t)$ and $U_v(t)$, respectively.

In an analogous way, mapping $b_{m+1}$=1101 to (11,01) directs the value I=01 to the WCD-p 1116 and directs the value Q=11 to the WCD-v 1118. This correctly corresponds to the second two bits of each of $U_p(t)$ and $U_v(t)$, respectively. And mapping the last four bits $b_{m+11}$=1011 to (10,11) directs the value I=11 to the WCD-p 1116 and directs the value Q=10 to the WCD-v 1118, correctly corresponding to the last bit of each of $U_p(t)$ and $U_v(t)$, respectively.

At both WCDs, the received analog signal is processed and digitally sampled to recover K complex symbols (not shown). In accordance with example embodiments, each of WCD-p 1116 and WCD-v 1118 can be informed ahead of time regarding which of the I or Q axes the WCD has been assigned. Then, in demodulating the K complex symbols, each WCD will pick out only the I or Q component according the assignment. This is indicated in FIG. 11 by the nomenclature of the recovered bit sub-streams. For example, the WCD-p 1116 recovers $b(I_m)$=10, $b(I_{m+1})$=01, . . . , and $b(I_{m+11})$=11. Similarly, the WCD-v 1118 recovers $b(Q_m)$=00, $b(Q_{m+1})$=11, . . . , and $b(Q_{m+11})$=10. The P/S converter 1106 of WCD-p 1116 then generates the serial bit stream $U_p(t)$=1001 . . . 1011, and the P/S converter 1108 of WCD-v 1118 generates the serial bit stream and the serial bit stream $U_v(t)$=0011 . . . 0010. Both WCD only retain their intended serial bit streams.

In accordance with example embodiments, each WCD can fully demodulate each complex symbol to recover both the I- and Q-components of each symbol, and then only retain the component assigned to the WCD. Alternatively, each WCD can demodulate each complex symbol only along the axis assigned to the WCD. Either approach will achieve the same end result. The first approach offers the possibility of implementation in WCDs without necessarily modifying existing capabilities developed for conventional demodulation of the full I-Q space. For purposes of the discussion herein, both approaches will be considered as demodulation along an assigned axis.

Comparing the example operation of the conventional approach illustrated in FIG. 10 with the technique of shared allocation of downlink resource blocks illustrated in FIG. 11 indicates an efficiency gain of about a factor of two in bandwidth utilization. It will be appreciated that this gain applies to the example described, and that in practice, the gain can be more or less depending on the particular circumstances, as well as details of how shared allocation is implemented. For example, while the number of bits per axis (I or Q) will be the same for any given modulation scheme, it may not necessarily be the case that the number of bits needed per I or Q symbol will be the same for both WCDs of a shared allocation. Furthermore, details of an implementation, such as scheduling and bit-stream blending, for example, can also impact the efficiency gain. However, shared allocation of downlink resource blocks to two WCDs—when it is deemed possible to do so—will in general provide for more efficient utilization of resources than exclusive allocation of resource blocks to the two WCDs.

Note that the technique for simultaneously sharing sub-carriers between two WCDs need not be applied to all the sub-carriers of a downlink resource block—and correspondingly to all the resource elements of the downlink resource block. It can be applied selectively to different resource elements on different sub-carriers during the same symbol time, different resource elements on the same sub-carrier as different symbol times, or different resource elements on different sub-carriers and during different symbol times. However, as a matter of implementation, since under LTE the smallest resource unit allocated to a WCD at any given time is already a resource block, applying the sharing technique to entire resource blocks can make practical sense.

The allocation of downlink resource blocks to WCDs could be made by BS 114, for example, or by some other entity in a wireless network such as network 112. The determination of whether to allocate a downlink resource block to a particular WCD or pair of WCDs could be made based on various factors. Such factors could include, for example, the amount of data that each WCD is to receive, the type of data that each WCD is to receive (e.g., whether the data is real-time data or non-real-time data), and the RF conditions at each WCD. The BS 114 or some other entity in wireless network 112 may determine the RF conditions at the WCDs based on reports transmitted by the WCDs. For example, in the LTE approach, each WCD can transmit a Channel Quality Indicator (CQI) that indicates the downlink data rate that the WCD can support, given the signal-to-interference plus noise ratio (SINR) at the WCD's location and the characteristics of the WCD's receiver. Thus, a CQI report from a WCD is indicative of the RF conditions at the WCD. Moreover, the CQI reported by a WCD can be used to select a modulation rate (e.g., QPSK, 16-QAM, or 64-QAM) for the OFDM symbols in a downlink resource block, as well as the level of error-correction coding that is provided. In this way, the CQI reports can be used to select a particular data transmission bandwidth for a downlink resource block.

If the data transmission bandwidth of the downlink resource block allocated to a given WCD is greater than the data rate that is needed to transmit the WCD's data, then the downlink resource block could also be allocated to an additional WCD. For example, a downlink resource block might be able to transmit data at a rate of 1 Mbits/second. However, if the data being transmitted to the WCD is voice data with a data rate on the order of 10 kbits/second, then the downlink resource block could be also used to transmit data to another WCD at the same time. For example, the downlink resource block could be used transmit multiple streams of voice data to two WCDs.

In the LTE approach, the allocation of downlink resource blocks to WCDs is communicated to the WCDs by the base station transmitting control signaling over the Physical Downlink Control Channel (PDCCH). The control signaling regarding allocation of a particular resource block could occur at the start of a slot that includes that particular resource block. In subsequent slots, the allocation of downlink resource blocks to the WCDs could be different. For example, a WCD might share downlink resource blocks with another WCD in one slot but not in the next slot. Thus, BS 114 may periodically evaluate, and potentially adjust, the allocation of downlink resource blocks to WCDs, and BS 114 may perform this evaluation every slot, for example.

3. EXAMPLE METHODS

Figure 12:
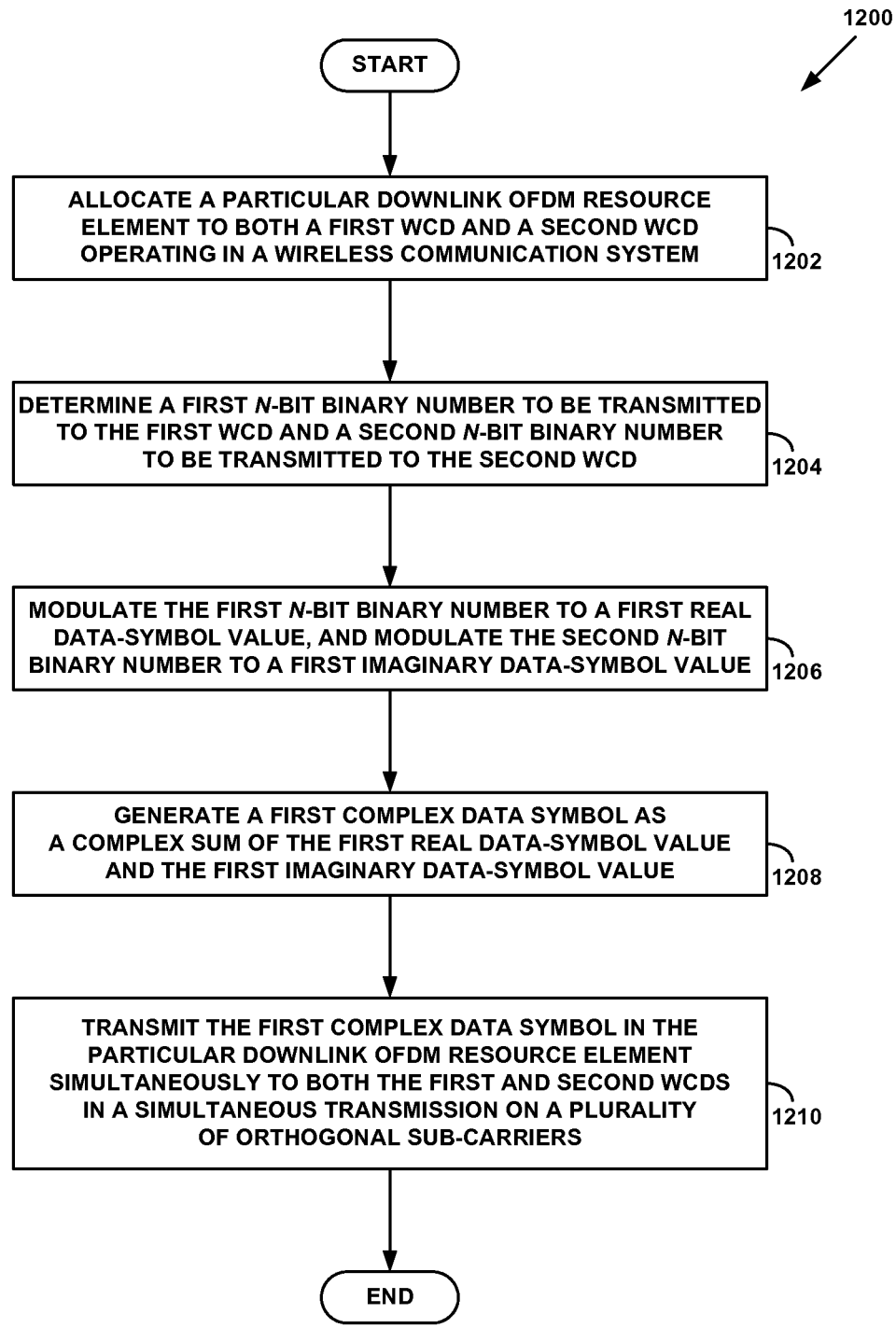
FIG. 12 is a flowchart of a method that may be performed by a base station, in accordance with an example embodiment.
Figure 13:
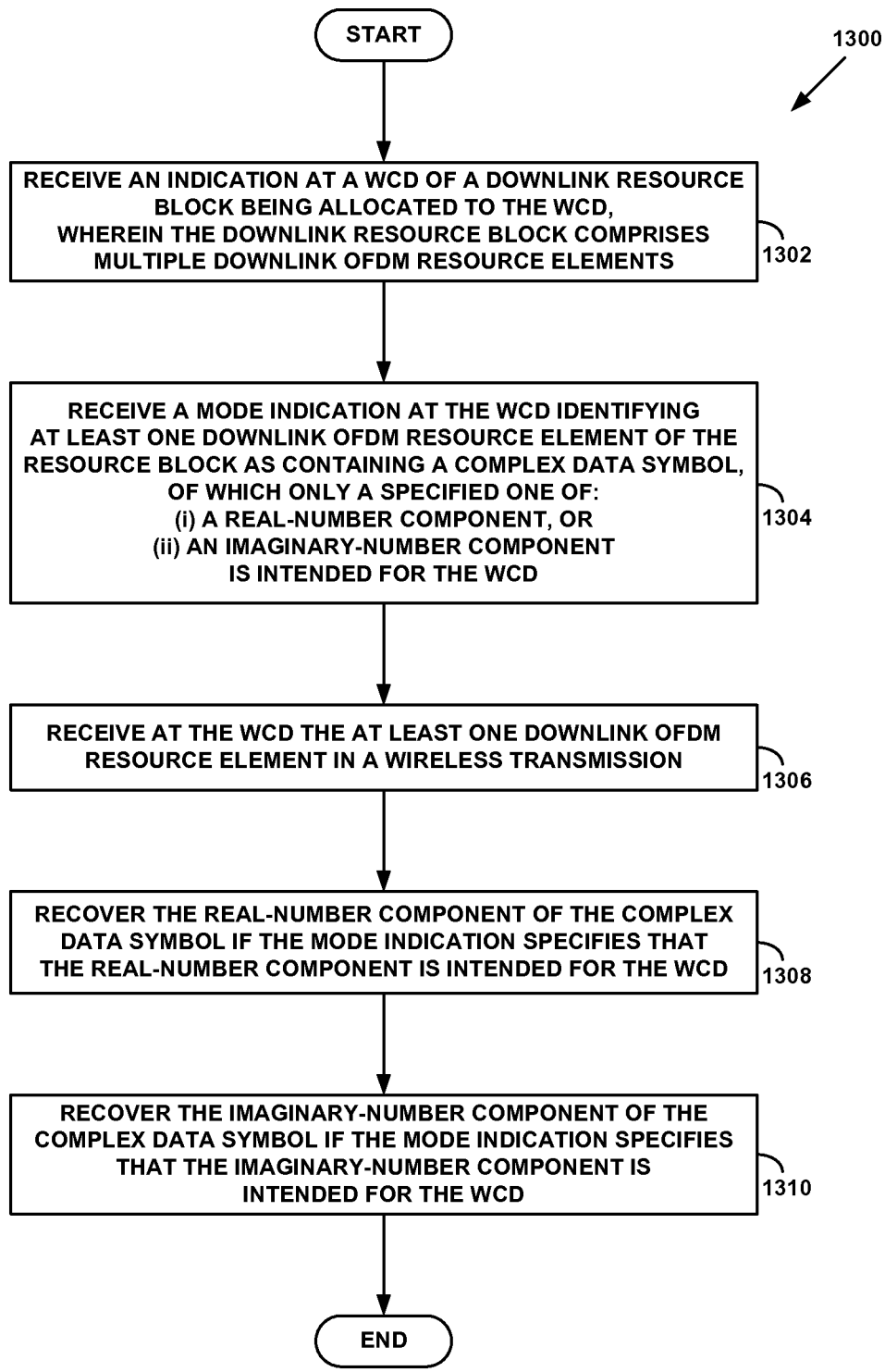
FIG. 13 is a flowchart of a method that may be performed by a WCD, in accordance with an example embodiment.

The example operation illustrated above involves aspects carried out by both a base station (or other entity that transmits data to WCDs on a downlink) and a WCD (or other entity that receives data on a downlink from a base station). As such, an example technique for concurrent allocation to two WCDs of one or more (or all) downlink resource elements of a downlink resource block can be implemented as respective methods on a base station and on a WCD. FIG. 12 is flowchart illustrating an example of such method 1200 that may be performed by a base station, such as the base station 300 in FIG. 3; and FIG. 13 is a flowchart illustrating an example of such a method 1300 that can be performed by a WCD, such as the WCD 400 in FIG. 4. By way of example, each of methods 1200 and 1300 can be implemented as machine language instructions that can be stored on non-transient machine-readable media (e.g, solid state memory, magnetic disk, etc), and that when executed by one or more processors or a base station or WCD cause the base station or WCD to carry out operations, steps, and/or functions of the respective methods.

In the method 1200, a base station serves multiple WCDs operating in the base station's wireless coverage area. More particularly, the base station can include a transmitter that defines the wireless coverage area. As one particular example, a base station, such as base station 114, might serve four WCD, such as the WCDs 116-122. In other examples, the base station might server a greater or fewer number of WCDs.

At step 1202 a base station allocates a particular downlink orthogonal frequency division multiplexing (OFDM) resource element to both a first WCD operating in a wireless communication system and a second WCD operating in the wireless communication system. In accordance with example embodiments, the particular downlink OFDM resource element is one of a plurality of OFDM resource elements configured for transmission by the wireless communication system on respective, orthogonal sub-carriers during a common symbol transmission time.

At step 1204 the base station determines a first N-bit binary number to be transmitted to the first WCD and a second N-bit binary number to be transmitted to the second WCD. N is an integer.

At step 1206 the base station modulates the first N-bit binary number to a first real data-symbol value on a real-number axis of a complex modulation plane, and modulates the second N-bit binary number to a first imaginary data-symbol value on an imaginary-number axis of the complex modulation plane.

At step 1208 the base station generates a first complex data symbol as a complex sum of the first real data-symbol value and the first imaginary data-symbol value.

Finally, at step 1210 the base station transmits the first complex data symbol in the particular downlink OFDM resource element simultaneously to both the first and second WCDs in a simultaneous transmission on all the orthogonal sub-carriers of the plurality of OFDM resource elements. In accordance with example embodiments, the first WCD is configured to recover the first N-bit binary number by demodulating the first complex data symbol along a real-number axis of a complex demodulation plane, and the second WCD is configured to recover the second N-bit binary number by demodulating the first complex data symbol along an imaginary-number axis of the complex demodulation plane.

In accordance with example embodiments, the particular downlink OFDM resource element can be configured in a downlink resource block that is made up of multiple downlink OFDM resource elements arrayed for a respective simultaneous transmission across a contiguous sequence of orthogonal sub-carriers at each respective one of a contiguous sequence of symbol transmission times. The particular downlink OFDM resource element can thus be one of a multiplicity of downlink OFDM resource elements of the downlink resource block that are each allocated to both the first WCD and the second WCD.

In further accordance, the method 1200 can also include allocating a different particular downlink OFDM resource element to both the first WCD the second WCD, where the different particular downlink OFDM resource element can also one of the plurality of OFDM resource elements configured for transmission by the wireless communication system on the respective, orthogonal sub-carriers during the same common symbol transmission time. As such, the particular downlink OFDM resource element and the different particular downlink resource elements can be configured for simultaneous transmission on different orthogonal sub-carriers.

More particularly, for the different particular downlink OFDM resource element, the base station can determine a first M-bit binary number to be transmitted to the first WCD and a second M-bit binary number to be transmitted to the second WCD. The first M-bit binary number can be modulated to a second real data-symbol value on the real-number axis of the complex modulation plane, the second M-bit binary number can be modulated to a second imaginary data-symbol value on the imaginary-number axis of the complex modulation plane. A second complex data symbol can then be generated as a complex sum of the second real data-symbol value and the second imaginary data-symbol value. The second complex data symbol can be transmitted in the different particular downlink OFDM resource element simultaneously to both the first and second WCDs in the simultaneous transmission on all the orthogonal sub-carriers of the plurality of OFDM resource elements. The first WCD can recover the first M-bit binary number by demodulating the second complex data symbol along the real-number axis of the complex demodulation plane, and the second WCD can recover the second M-bit binary number by demodulating the second complex data symbol along the imaginary-number axis of the complex demodulation plane.

Also in accordance with example embodiments, the method 1200 can also include allocating a different particular downlink OFDM resource element to both the first WCD the second WCD, where the different particular downlink OFDM resource element is instead one of a different plurality of OFDM resource elements configured for transmission by the wireless communication system on the respective, orthogonal sub-carriers during a different common symbol transmission time. As such, the particular downlink OFDM resource element and the different particular downlink resource elements can be configured for transmission on the same or on different orthogonal sub-carriers, since they are transmitted at different times.

Again, for the different particular downlink OFDM resource element, the base station can determine a first M-bit binary number to be transmitted to the first WCD and a second M-bit binary number to be transmitted to the second WCD. The first M-bit binary number can be modulated to a second real data-symbol value on the real-number axis of the complex modulation plane, the second M-bit binary number can be modulated to a second imaginary data-symbol value on the imaginary-number axis of the complex modulation plane. A second complex data symbol can then be generated as a complex sum of the second real data-symbol value and the second imaginary data-symbol value. The second complex data symbol can be transmitted in the different particular downlink OFDM resource element simultaneously to both the first and second WCDs in the simultaneous transmission on all the orthogonal sub-carriers of, now, the different plurality of OFDM resource elements. The first WCD can once more recover the first M-bit binary number by demodulating the second complex data symbol along the real-number axis of the complex demodulation plane, and the second WCD can recover the second M-bit binary number by demodulating the second complex data symbol along the imaginary-number axis of the complex demodulation plane.

In further accordance with example embodiments, the method 1200 can also include transmitting information to the first WCD indicating that the first WCD should demodulate a real component of the first complex data symbol in the particular downlink OFDM resource element. In addition, information can be transmitted to the second WCD indicating that the second WCD should demodulate an imaginary component of the first complex data symbol in the particular downlink OFDM resource element.

In further accordance with example embodiments, the base station could receive a data stream including first data for the first WCD and second data for the second WCD, and could identify the particular downlink OFDM resource element as being available for allocation. The base station could also determine that RF operating conditions in the wireless coverage area are of sufficient quality to support transmission to both the first and second WCDs of a complex data symbol comprising a sum of an N-bit binary real number and an N-bit binary imaginary number in the particular downlink OFDM resource element. The base station could further determine that at least a portion of the first data can be encoded in an N-bit binary number and that at least a portion of the second data can be encoded in an N-bit binary number. For example, the base station can determine that RF conditions support 16-QAM to both WCDs on a particular sub-carrier, and that at least a portion of the data to each WCD can be transmitted in a 2-bit binary number.

In the method 1300, a WCD, such as WCD 116, can be operating in a wireless coverage area of a base station, such as base station 114. The base station can concurrently allocate a downlink resource block (or selected resource elements of a resource block) to both the WCD and a second WCD (e.g., WCD 118).

At step 1302, a wireless communication device (WCD) receiving an indication of a downlink resource block being allocated to the WCD, wherein the downlink resource block comprises multiple downlink OFDM resource elements arrayed for a respective simultaneous transmission across a contiguous sequence of orthogonal sub-carriers at each respective one of a contiguous sequence of symbol transmission times.

At step 1304, the WCD receiving a mode indication identifying at least one downlink OFDM resource element of the multiple downlink OFDM resource elements as containing a complex data symbol, of which only a specified one of (i) a real-number component or (ii) an imaginary-number component is intended for the WCD.

At step 1306, the WCD receiving the at least one downlink OFDM resource element in a wireless transmission.

At step 1308, the WCD recovering the real-number component of the complex data symbol contained in the at least one downlink OFDM resource element if the mode indication specifies that the real-number component is intended for the WCD.

Finally, at step 1310, the WCD recovering the imaginary-number component of the complex data symbol contained in the at least one downlink OFDM resource element if the mode indication specifies that the imaginary-number component is intended for the WCD.

In accordance with example embodiments, receiving the at least one downlink OFDM resource element in the wireless transmission can entail receiving the at least one downlink OFDM resource element in one of the respective simultaneous transmissions across the contiguous sequence of orthogonal sub-carriers during one of the respective the symbol transmission times of the contiguous sequence of symbol transmission times.

Also in accordance with example embodiments, recovering the real-number component of the complex data symbol contained in the at least one downlink OFDM resource element can entail demodulating the complex data symbol along only a real-number axis of a complex demodulation plane. Alternatively, recovering the real-number component of the complex data symbol contained in the at least one downlink OFDM resource element can entail demodulating the complex data symbol along a real-number axis of a complex demodulation plane and along an imaginary-number axis of the complex demodulation plane, and then retaining only the real-number component from the demodulation along the real-number axis.

Similarly, recovering the imaginary-number component of the complex data symbol contained in the at least one downlink OFDM resource element can entail demodulating the complex data symbol along only an imaginary-number axis of a complex demodulation plane. Alternatively, recovering the imaginary-number component of the complex data symbol contained in the at least one downlink OFDM resource element can entail demodulating the complex data symbol along a real-number axis of a complex demodulation plane and along an imaginary-number axis of the complex demodulation plane, and then retaining only the imaginary-number component from the demodulation along the real-number axis.

It will be appreciated that the example methods 1200 and 1300 could each include alternate and/or additional steps, while still remaining within the scope and spirit of example embodiments herein.

4. CONCLUSION

Exemplary embodiments have been described above. Those skilled in the art will understand, however, that changes and modifications may be made to these embodiments without departing from the true scope and spirit of the invention.

What is claimed is:
1. A method comprising:
  allocating a particular downlink orthogonal frequency division multiplexing (OFDM) resource element to both a first wireless communication device (WCD) operating in a wireless communication system and a second WCD operating in the wireless communication system, wherein the particular downlink OFDM resource element is one of a plurality of OFDM resource elements configured for transmission by the wireless communication system on respective, orthogonal sub-carriers during a common symbol transmission time;
  determining a first N-bit binary number to be transmitted to the first WCD and a second N-bit binary number to be transmitted to the second WCD;
  modulating the first N-bit binary number to a first real data-symbol value on a real-number axis of a complex modulation plane, and modulating the second N-bit binary number to a first imaginary data-symbol value on an imaginary-number axis of the complex modulation plane;
  generating a first complex data symbol as a complex sum of the first real data-symbol value and the first imaginary data-symbol value; and
  by a transmitter of the wireless communication system, transmitting the first complex data symbol in the particular downlink OFDM resource element simultaneously to both the first and second WCDs in a simultaneous transmission on all the orthogonal sub-carriers of the plurality of OFDM resource elements,
  wherein the first WCD is configured to recover the first N-bit binary number by demodulating the first complex data symbol along a real-number axis of a complex demodulation plane, and the second WCD is configured to recover the second N-bit binary number by demodulating the first complex data symbol along an imaginary-number axis of the complex demodulation plane.
2. The method of claim 1, further comprising:
  allocating a different particular downlink OFDM resource element to both the first WCD the second WCD, wherein the different particular downlink OFDM resource element is also one of the plurality of OFDM resource elements configured for transmission by the wireless communication system on the respective, orthogonal sub-carriers during the same common symbol transmission time;
  determining a first M-bit binary number to be transmitted to the first WCD and a second M-bit binary number to be transmitted to the second WCD;

modulating the first M-bit binary number to a second real data-symbol value on the real-number axis of the complex modulation plane, and modulating the second M-bit binary number to a second imaginary data-symbol value on the imaginary-number axis of the complex modulation plane;

generating a second complex data symbol as a complex sum of the second real data-symbol value and the second imaginary data-symbol value; and by the transmitter of the wireless communication system, transmitting the second complex data symbol in the different particular downlink OFDM resource element simultaneously to both the first and second WCDs in the simultaneous transmission on all the orthogonal sub-carriers of the plurality of OFDM resource elements, wherein the first WCD is configured to recover the first M-bit binary number by demodulating the second complex data symbol along the real-number axis of the complex demodulation plane, and the second WCD is configured to recover the second M-bit binary number by demodulating the second complex data symbol along the imaginary-number axis of the complex demodulation plane.

3. The method of claim 2, wherein modulating the first and second N-bit binary numbers comprises modulating the first and second N-bit binary numbers using a first one of the respective the orthogonal sub-carriers, and wherein modulating the first and second M-bit binary numbers comprises modulating the first and second M-bit binary numbers using a second one of the respective the orthogonal sub-carriers.

4. The method of claim 1, further comprising:

allocating a different particular downlink OFDM resource element to both the first WCD the second WCD, wherein the different particular downlink OFDM resource element is one of a different plurality of OFDM resource elements configured for transmission by the wireless communication system on the respective, orthogonal sub-carriers during a different common symbol transmission time;

determining a first M-bit binary number to be transmitted to the first WCD and a second M-bit binary number to be transmitted to the second WCD;

modulating the first M-bit binary number to a second real data-symbol value on the real-number axis of the complex modulation plane, and modulating the second M-bit binary number to a second imaginary data-symbol value on the imaginary-number axis of the complex modulation plane;

generating a second complex data symbol as a complex sum of the second real data-symbol value and the second imaginary data-symbol value; and by the transmitter of the wireless communication system, transmitting the second complex data symbol in the different particular downlink OFDM resource element simultaneously to both the first and second WCDs in the simultaneous transmission on all the orthogonal sub-carriers of the different plurality of OFDM resource elements, wherein the first WCD is configured to recover the first M-bit binary number by demodulating the second complex data symbol along the real-number axis of the complex demodulation plane, and the second WCD is configured to recover the second M-bit binary number by demodulating the second complex data symbol along the imaginary-number axis of the complex demodulation plane.

5. The method of claim 1, wherein the particular downlink OFDM resource element is configured in a downlink resource block comprising multiple downlink OFDM resource elements arrayed for a respective simultaneous transmission across a contiguous sequence of orthogonal sub-carriers at each respective one of a contiguous sequence of symbol transmission times.

6. The method of claim 5, wherein the particular downlink OFDM resource element is one of a multiplicity of downlink OFDM resource elements of the downlink resource block that are each allocated to both the first WCD and the second WCD.

7. The method of claim 1, further comprising:

transmitting, by the transmitter, information to the first WCD indicating that the first WCD should demodulate a real component of the first complex data symbol in the particular downlink OFDM resource element; and transmitting, by the transmitter, information to the second WCD indicating that the second WCD should demodulate an imaginary component of the first complex data symbol in the particular downlink OFDM resource element.

8. The method of claim 1, wherein the transmitter defines a wireless coverage area of the wireless communication system and the first and second WCDs are operating in the wireless coverage area.

9. The method of claim 8, further comprising:

receiving a data stream including first data for the first WCD and second data for the second WCD;

identifying the particular downlink OFDM resource element as being available for allocation;

determining that radio frequency (RF) operating conditions in the wireless coverage area are of sufficient quality to support transmission to both the first and second WCDs of a complex data symbol comprising a sum of an N-bit binary real number and an N-bit binary imaginary number in the particular downlink OFDM resource element; and determining that at least a portion of the first data can be encoded in an N-bit binary number and that at least a portion of the second data can be encoded in an N-bit binary number.

10. A method comprising:

a wireless communication device (WCD) receiving an indication of a downlink resource block being allocated to the WCD, wherein the downlink resource block comprises multiple downlink OFDM resource elements arrayed for a respective simultaneous transmission across a contiguous sequence of orthogonal sub-carriers at each respective one of a contiguous sequence of symbol transmission times;

the WCD receiving a mode indication identifying at least one downlink OFDM resource element of the multiple downlink OFDM resource elements as containing a complex data symbol, of which only a specified one of (i) a real-number component or (ii) an imaginary-number component is intended for the WCD;

the WCD receiving the at least one downlink OFDM resource element in a wireless transmission;

the WCD recovering the real-number component of the complex data symbol contained in the at least one downlink OFDM resource element if the mode indication specifies that the real-number component is intended for the WCD; and the WCD recovering the imaginary-number component of the complex data symbol contained in the at least one downlink OFDM resource element if the mode indication specifies that the imaginary-number component is intended for the WCD.

11. The method of claim 10, wherein receiving the at least one downlink OFDM resource element in the wireless transmission comprises receiving the at least one downlink OFDM resource element in one of the respective simultaneous transmissions across the contiguous sequence of orthogonal sub-carriers during one of the respective the symbol transmission times of the contiguous sequence of symbol transmission times.

12. The method of claim 10, wherein recovering the real-number component of the complex data symbol contained in the at least one downlink OFDM resource element comprises demodulating the complex data symbol along only a real-number axis of a complex demodulation plane.

13. The method of claim 10, wherein recovering the real-number component of the complex data symbol contained in the at least one downlink OFDM resource element comprises:
demodulating the complex data symbol along a real-number axis of a complex demodulation plane and along an imaginary-number axis of the complex demodulation plane; and
retaining only the real-number component from the demodulation along the real-number axis.

14. The method of claim 10, wherein recovering the imaginary-number component of the complex data symbol contained in the at least one downlink OFDM resource element comprises demodulating the complex data symbol along only an imaginary-number axis of a complex demodulation plane.

15. The method of claim 10, wherein recovering the imaginary-number component of the complex data symbol contained in the at least one downlink OFDM resource element comprises:
demodulating the complex data symbol along a real-number axis of a complex demodulation plane and along an imaginary-number axis of the complex demodulation plane; and
retaining only the imaginary-number component from the demodulation along the imaginary-number axis.

16. A base station comprising:
a transmitter for transmitting downlink data to wireless communication devices (WCDs) operating in a wireless coverage area of the base station;
one or more processors;
memory accessible to the one or more processors; and
machine-readable instructions stored in the memory, that upon execution by the one or more processors cause the base station to carry out operations including:
allocating a particular downlink orthogonal frequency division multiplexing (OFDM) resource element to both a first WCD operating in the wireless coverage area and a second WCD operating in the wireless coverage area, wherein the particular downlink OFDM resource element is one of a plurality of OFDM resource elements configured for transmission by the base station on respective, orthogonal sub-carriers during a common symbol transmission time,
determining a first N-bit binary number to be transmitted to the first WCD and a second N-bit binary number to be transmitted to the second WCD,
modulating the first N-bit binary number to a first real data-symbol value on a real-number axis of a complex modulation plane, and modulating the second N-bit binary number to a first imaginary data-symbol value on an imaginary-number axis of the complex modulation plane,
generating a first complex data symbol as a complex sum of the first real data-symbol value and the first imaginary data-symbol value, and
causing the transmitter to transmit the first complex data symbol in the particular downlink OFDM resource element simultaneously to both the first and second WCDs in a simultaneous transmission on all the orthogonal sub-carriers of the plurality of OFDM resource elements,
wherein the first WCD is configured to recover the first N-bit binary number by demodulating the first complex data symbol along a real-number axis of a complex demodulation plane, and the second WCD is configured to recover the second N-bit binary number by demodulating the first complex data symbol along an imaginary-number axis of the complex demodulation plane.

17. The base station of claim 16, wherein the particular downlink OFDM resource element is configured in a downlink resource block comprising multiple downlink OFDM resource elements arrayed for a respective simultaneous transmission across a contiguous sequence of orthogonal sub-carriers at each respective one of a contiguous sequence of symbol transmission times,
and wherein the particular downlink OFDM resource element is one of a multiplicity of downlink OFDM resource elements of the downlink resource block that are each allocated to both the first WCD and the second WCD.

18. The base station of claim 16, wherein the operations further include:
causing the transmitter to transmit one or more first messages to the first WCD indicating that the first WCD should demodulate a real component of the first complex data symbol in the particular downlink OFDM resource element; and
causing the transmitter to transmit one or more second messages to the second WCD indicating that the second WCD should demodulate an imaginary component of the first complex data symbol in the particular downlink OFDM resource element.

19. The base station of claim 16, wherein the operations further include:
receiving a data stream including first data for the first WCD and second data for the second WCD;
identifying the particular downlink OFDM resource element as being available for allocation;
determining that radio frequency (RF) operating conditions in the wireless coverage area are of sufficient quality to support transmission to both the first and second WCDs of a complex data symbol comprising a sum of an N-bit binary real number and an N-bit binary imaginary number in the particular downlink OFDM resource element; and
determining that at least a portion of the first data can be encoded in an N-bit binary number and that at least a portion of the second data can be encoded in an N-bit binary number.

20. The base station of claim 16, wherein the operations further include:
allocating a different particular downlink OFDM resource element to both the first WCD the second WCD;

determining a first M-bit binary number to be transmitted to the first WCD and a second M-bit binary number to be transmitted to the second WCD;

modulating the first M-bit binary number to a second real data-symbol value on the real-number axis of the complex modulation plane, and modulating the second M-bit binary number to a second imaginary data-symbol value on the imaginary-number axis of the complex modulation plane;

generating a second complex data symbol as a complex sum of the second real data-symbol value and the second imaginary data-symbol value; and causing the transmitter to transmit the second complex data symbol in the different particular downlink OFDM resource element simultaneously to both the first and second WCDs, wherein the first WCD is configured to recover the first M-bit binary number by demodulating the second complex data symbol along the real-number axis of the complex demodulation plane, and the second WCD is configured to recover the second M-bit binary number by demodulating the second complex data symbol along the imaginary-number axis of the complex demodulation plane, and wherein the particular downlink OFDM resource element and the different particular downlink OFDM resource element are one of: (i) modulated on the same orthogonal sub-carrier and transmitted during different symbol transmission times, (ii) modulated on different orthogonal sub-carriers and transmitted during the same symbol transmission time, or (iii) modulated on different orthogonal sub-carriers and transmitted during different symbol transmission times.

* * * * *